United States Patent
Fiala et al.

Patent Number: 6,120,148
Date of Patent: Sep. 19, 2000

[54] DIFFRACTIVE LENS

[75] Inventors: Werner Fiala, Vienna; Johann Pingitzer, Schattendorf, both of Austria

[73] Assignee: Bifocon Optics GmbH, Vienna, Austria

[21] Appl. No.: 09/166,312

[22] Filed: Oct. 5, 1998

[51] Int. Cl.⁷ .................................................. G02C 7/04
[52] U.S. Cl. ........................ 351/161; 351/172; 359/565; 623/6
[58] Field of Search .............................. 351/160 R, 161, 351/168, 172; 623/6; 359/558, 565, 574, 571, 575

[56] References Cited

U.S. PATENT DOCUMENTS

| | | | |
|---|---|---|---|
| 4,210,391 | 7/1980 | Cohen | 351/161 |
| 4,338,005 | 7/1982 | Cohen | 351/161 |
| 4,340,283 | 7/1982 | Cohen | 351/161 |
| 4,637,697 | 1/1987 | Freeman | 351/161 |
| 4,641,934 | 2/1987 | Freeman | 351/159 |
| 4,642,112 | 2/1987 | Freeman | 623/6 |
| 4,655,565 | 4/1987 | Freeman | 351/159 |
| 4,786,160 | 11/1988 | Furter | 351/169 |
| 4,828,558 | 5/1989 | Kelman | 623/6 |
| 4,830,481 | 5/1989 | Futhey et al. | 351/161 |
| 4,936,666 | 6/1990 | Futhey | 351/161 |
| 5,054,905 | 10/1991 | Cohen | 351/161 |
| 5,056,908 | 10/1991 | Cohen | 351/161 |
| 5,104,212 | 4/1992 | Taboury et al. | 351/160 H |
| 5,117,306 | 5/1992 | Cohen | 351/161 |
| 5,120,120 | 6/1992 | Cohen | 351/161 |
| 5,121,979 | 6/1992 | Cohen | 351/161 |
| 5,121,980 | 6/1992 | Cohen | 351/161 |
| 5,129,718 | 7/1992 | Furley et al. | 351/161 |
| 5,144,483 | 9/1992 | Cohen | 351/161 |
| 5,152,788 | 10/1992 | Isaacson et al. | 623/6 |
| 5,229,797 | 7/1993 | Futhey et al. | 351/161 |
| 5,629,800 | 5/1997 | Hamblen | 359/565 |

FOREIGN PATENT DOCUMENTS

| | | |
|---|---|---|
| 0 367 878 A1 | 5/1990 | European Pat. Off. . |
| 0 468 410 A1 | 1/1992 | European Pat. Off. . |
| 0 766 951 A1 | 4/1997 | European Pat. Off. . |
| 41 34 518 A1 | 4/1993 | Germany . |
| 1154360 | 6/1969 | United Kingdom . |

*Primary Examiner*—Huy Mai
*Attorney, Agent, or Firm*—Hofmann & Baron, LLP

[57] ABSTRACT

A multifocal diffractive lens includes at least two annular zone lenses. Provided between adjacent annular zone lenses is an optical step. Each annular zone lens exhibits a refractive power profile $D_{g,i}(r)$ wherein i is any i-th annular zone lens and r is the distance between an axis of the diffractive lens and a point on a back surface of the lens. The lens is further characterized in that an average power of zones i,j . . . are given by $D_{av,i}$, $D_{avj}$ . . . respectively, and optical path lengths of light rays extending from an object point to a conjugated image point are different by the optical step for light rays transmitting through adjacent annular zone lenses. The annular zone lenses are shaped and positioned such that all of the average refractive powers $D_{av,i}$, $D_{avj}$ . . . are substantially equal to a single value, $D_{av}$.

32 Claims, 23 Drawing Sheets

EXAMPLE OF A ZONE POWER FUNCTION WITH IDENTICAL AVERAGE POWERS IN ALL ZONES

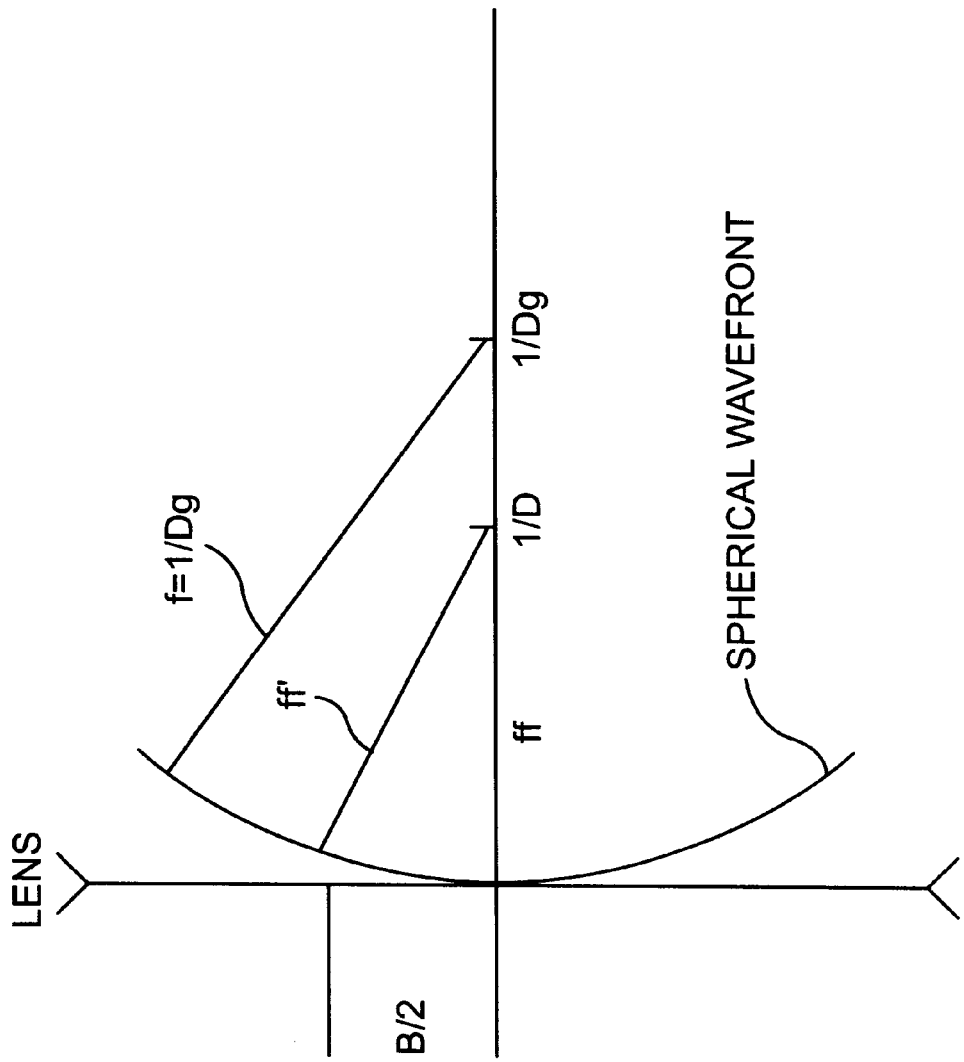
FIG-1 PATH LENGTH ERROR ff' - ff IN DEFOCUS POWER D

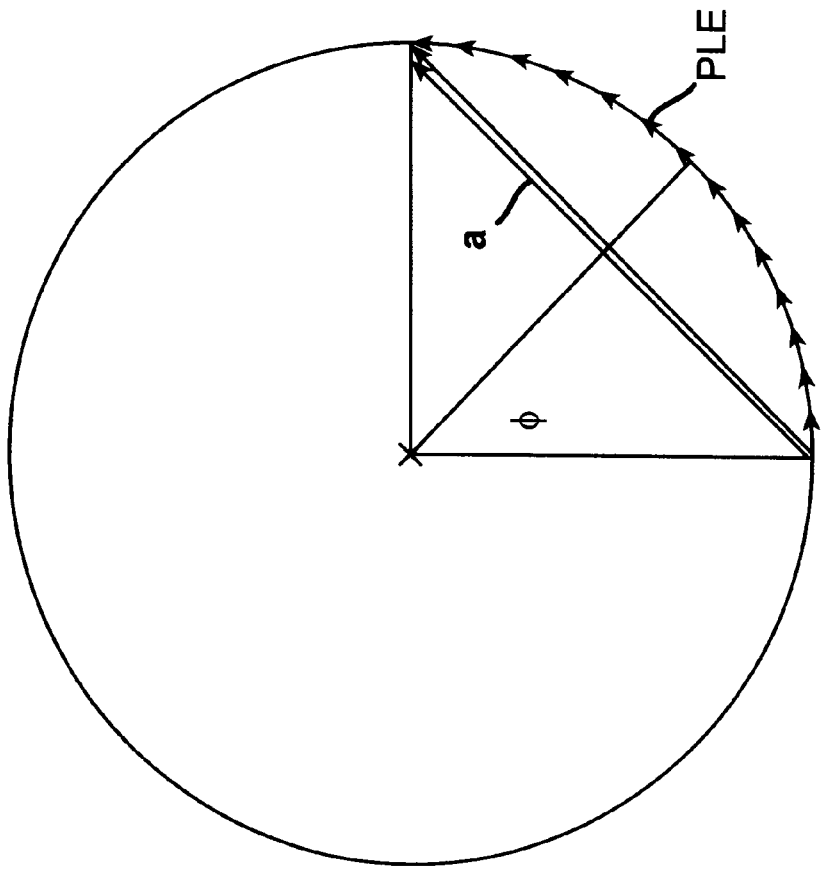
FIG-2  PHASE ANGLE φ AND AMPLITUDE a AS A FUNCTION OF PLE AND λ

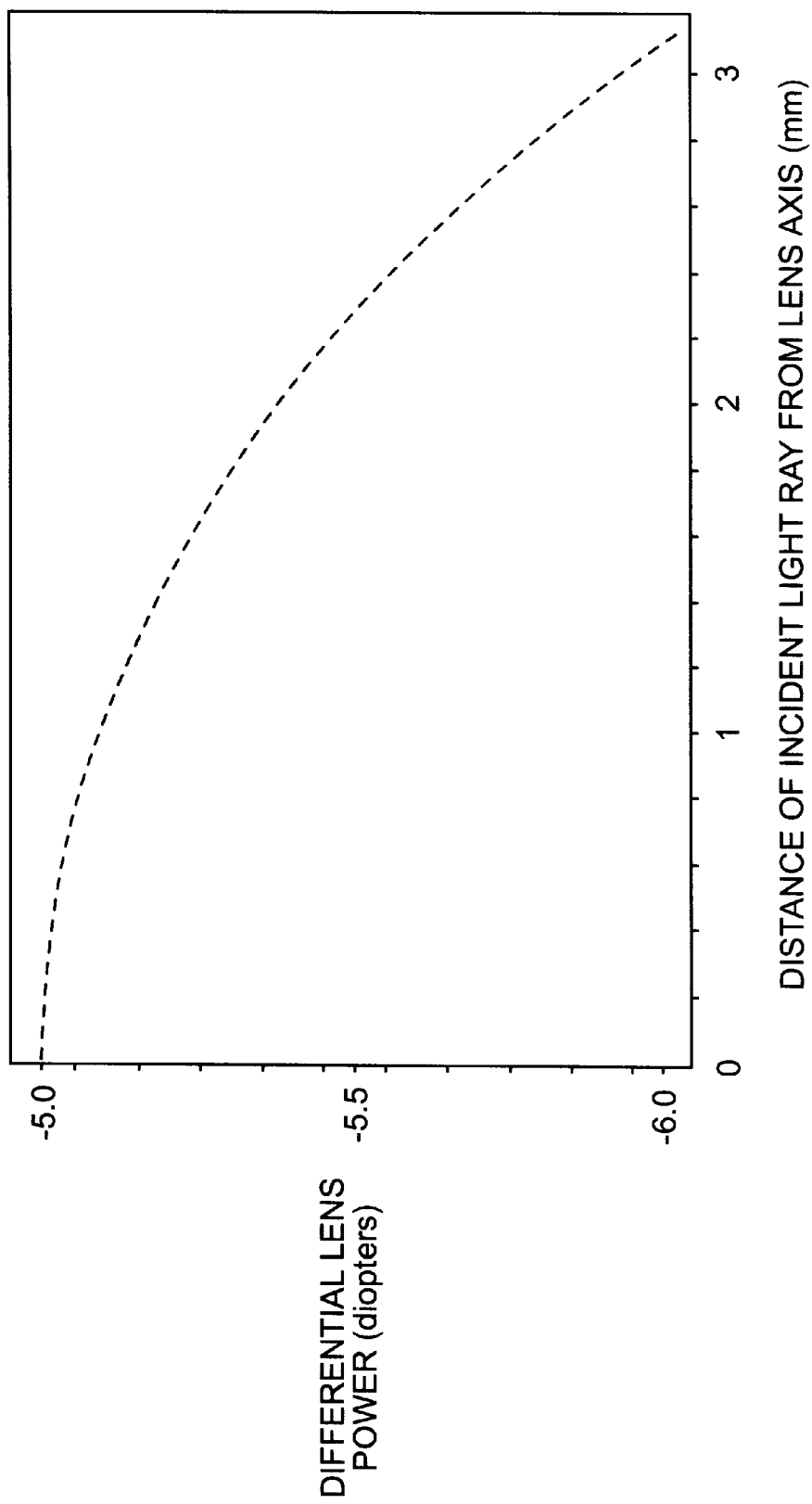
FIG-3 SPHERICAL ABERRATION OF A SPHERICAL LENS
lens data: n = 1.49, back radius = 8 mm, front radius = 8.74 mm, c. thickness = 0.1 mm

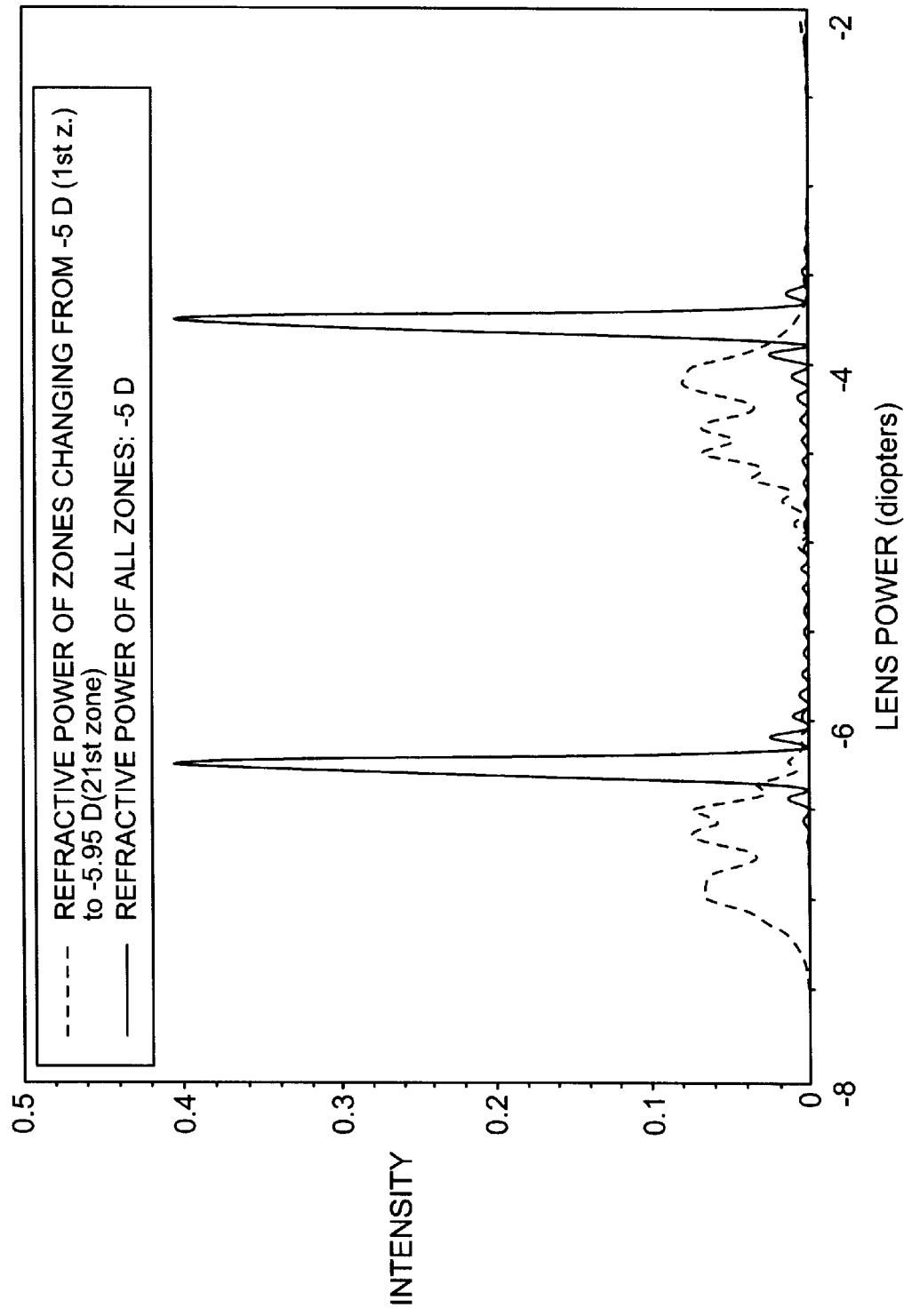
FIG-4 TFRs OF TWO DIFFRACTIVE BIFOCAL LENSES FOR MONOCHROMATIC LIGHT (550 nm)

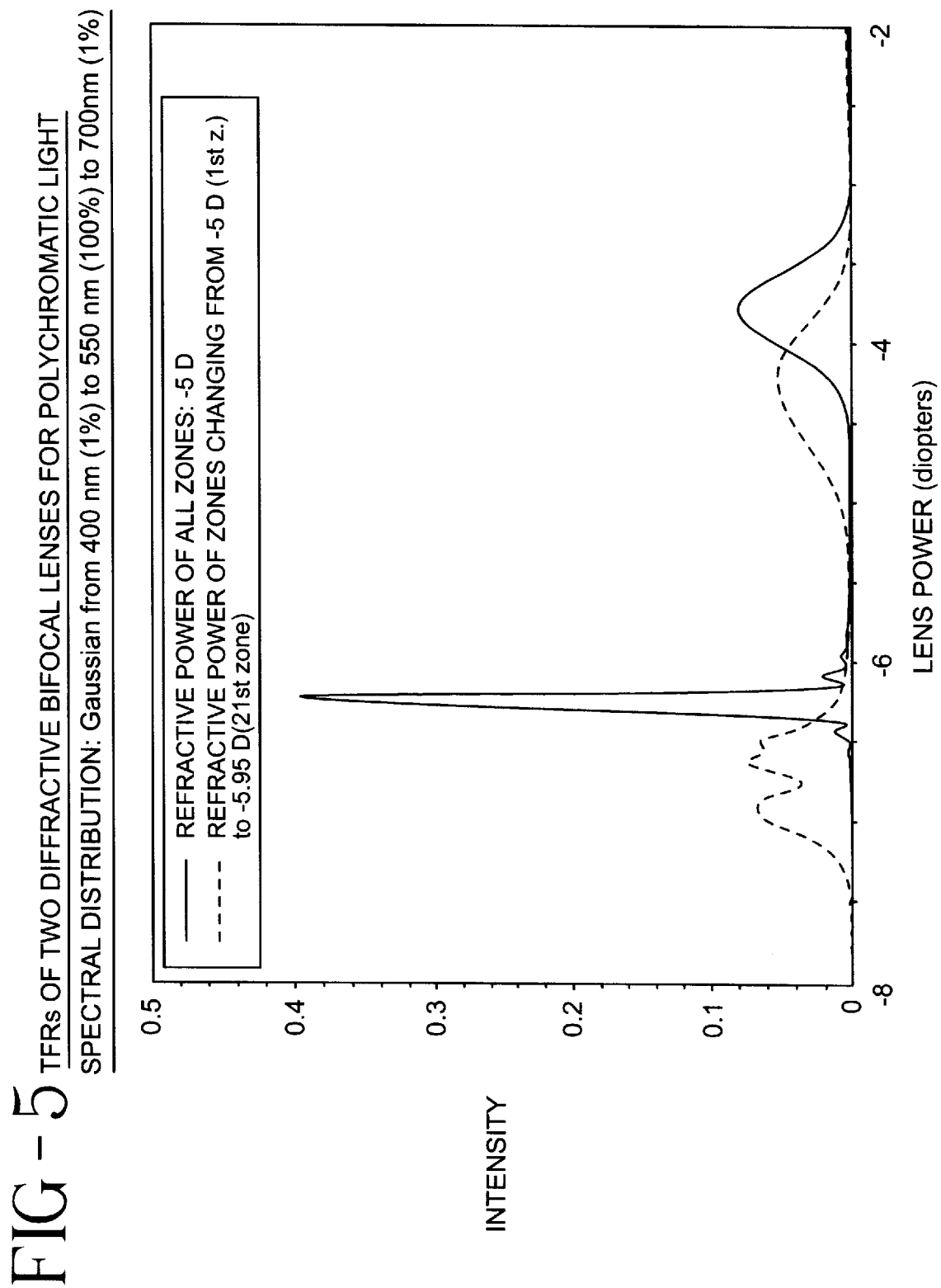
FIG-5 TFRs OF TWO DIFFRACTIVE BIFOCAL LENSES FOR POLYCHROMATIC LIGHT
SPECTRAL DISTRIBUTION: Gaussian from 400 nm (1%) to 550 nm (100%) to 700nm (1%)

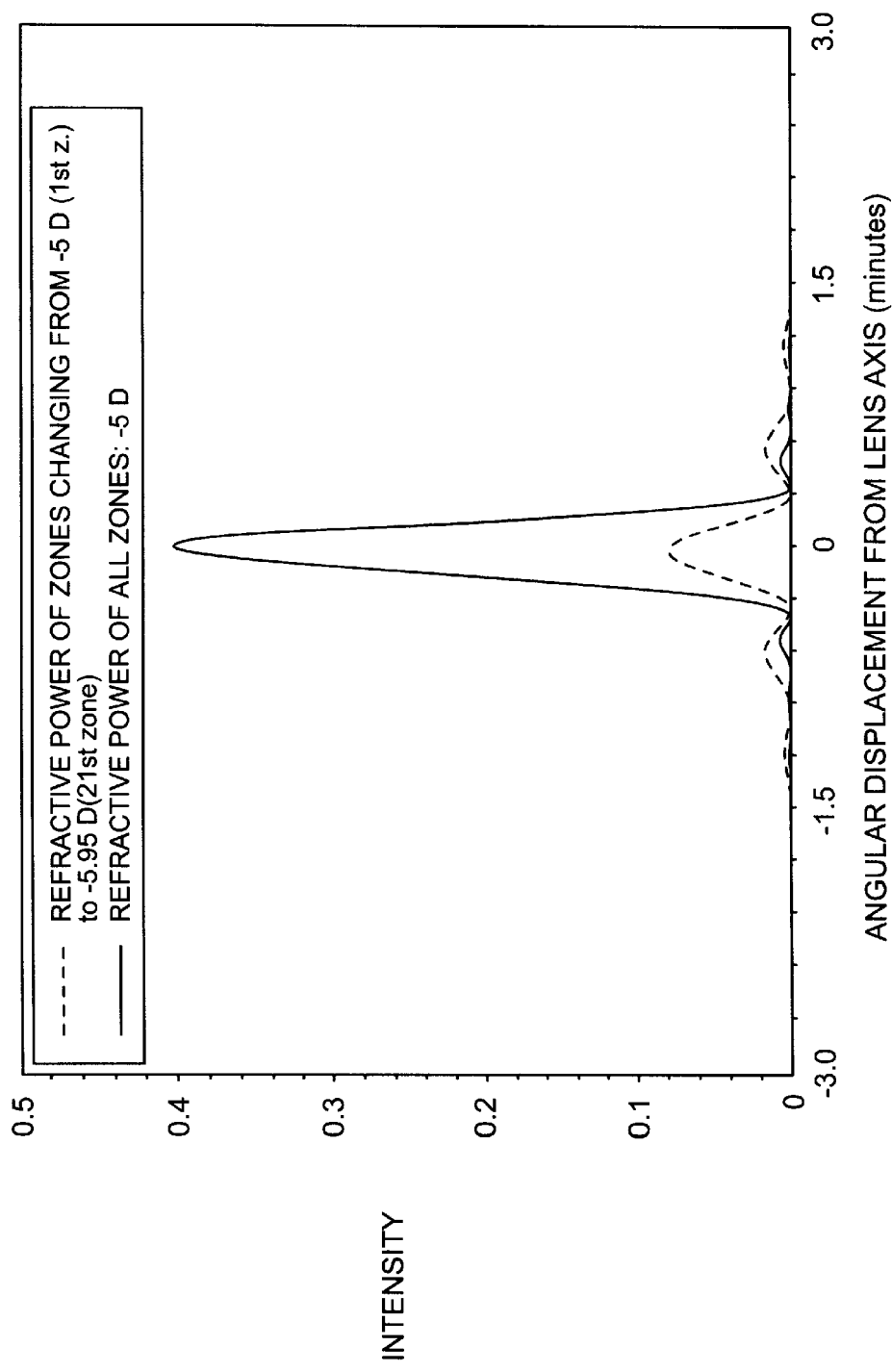
FIG-6 PSFs OF TWO DIFFRACTIVE BIFOCAL LENSES FOR MONOCHROMATIC LIHGT (550 nm) PSFs CALCULATED IN THE VIEWING POWERS

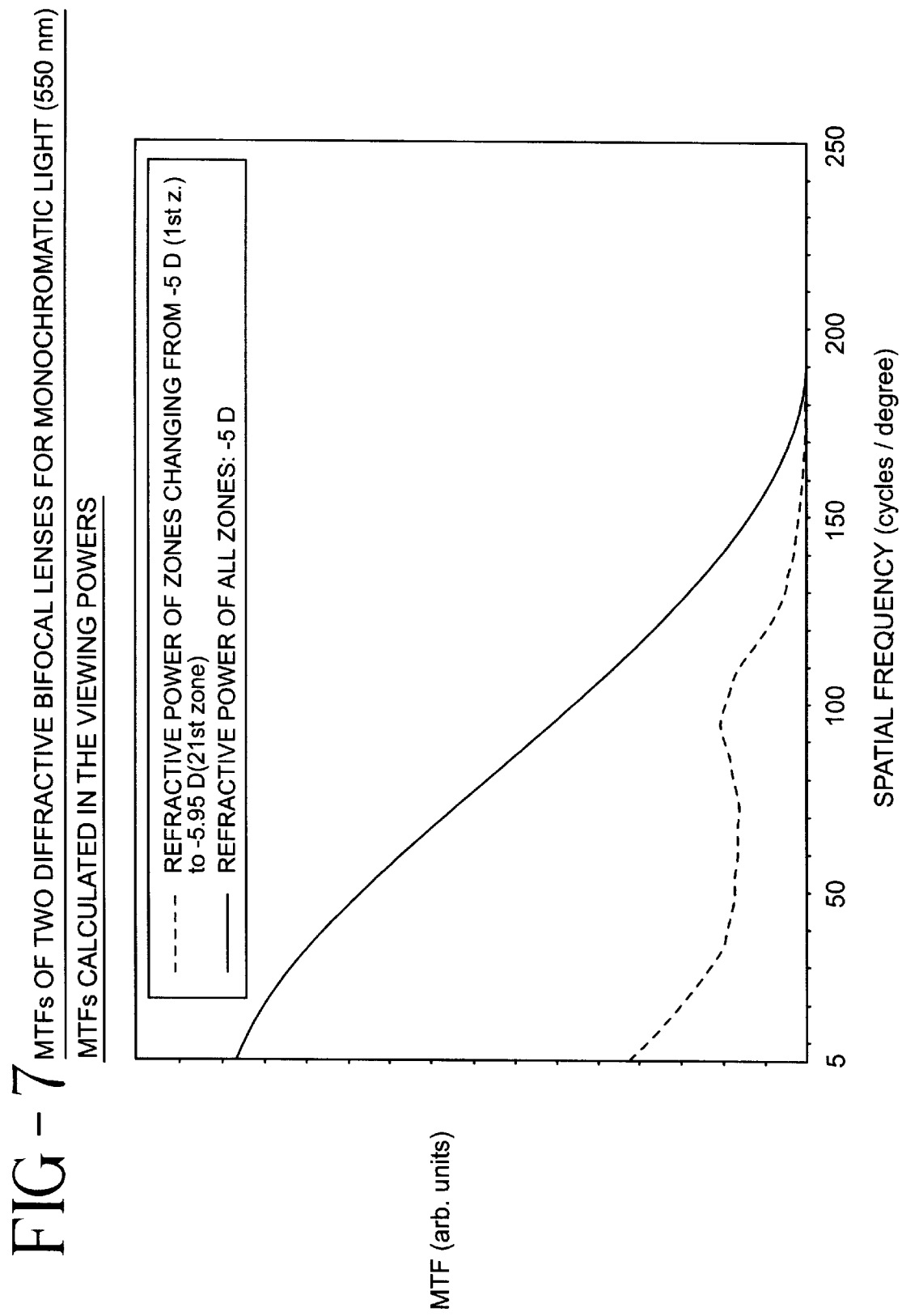

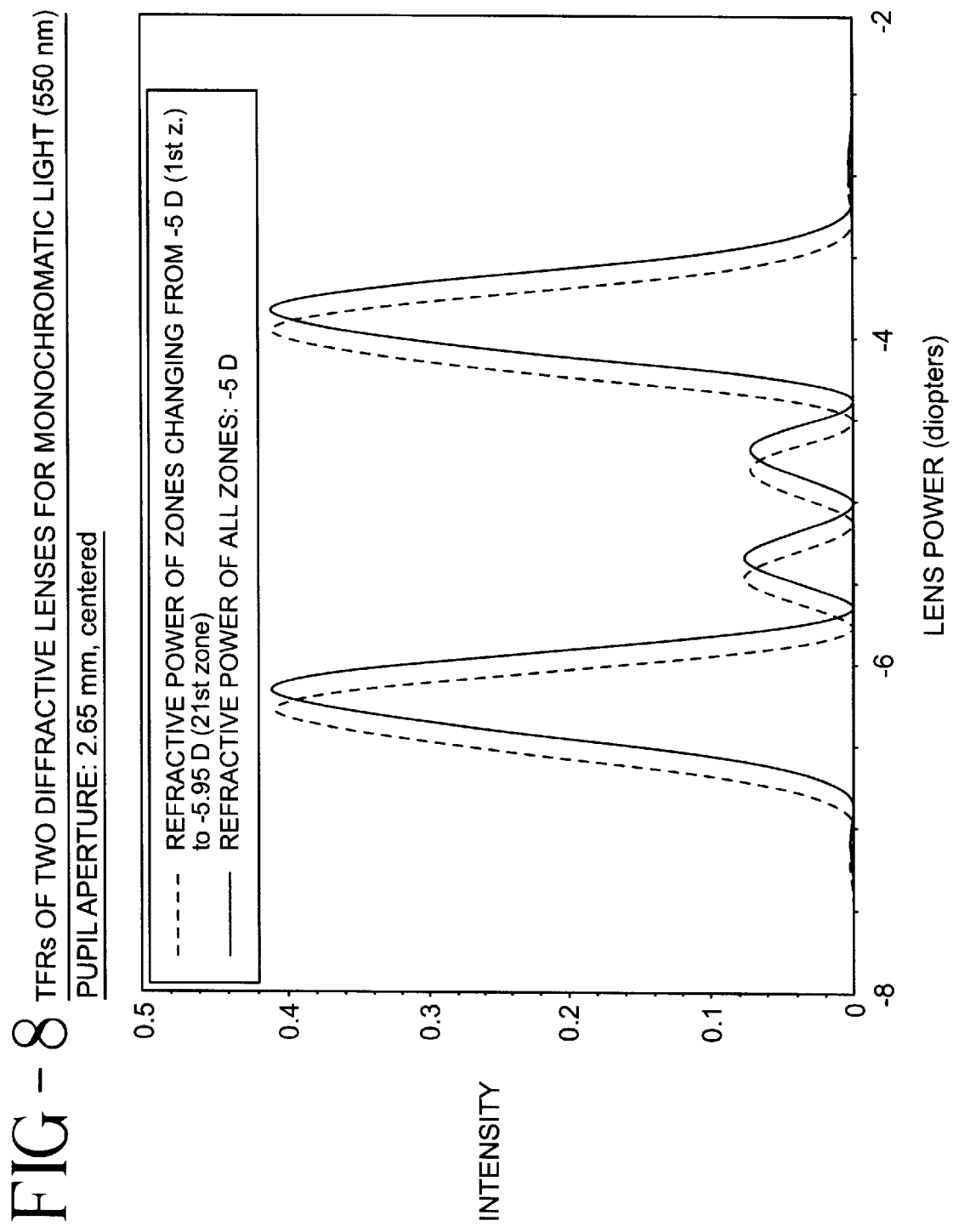

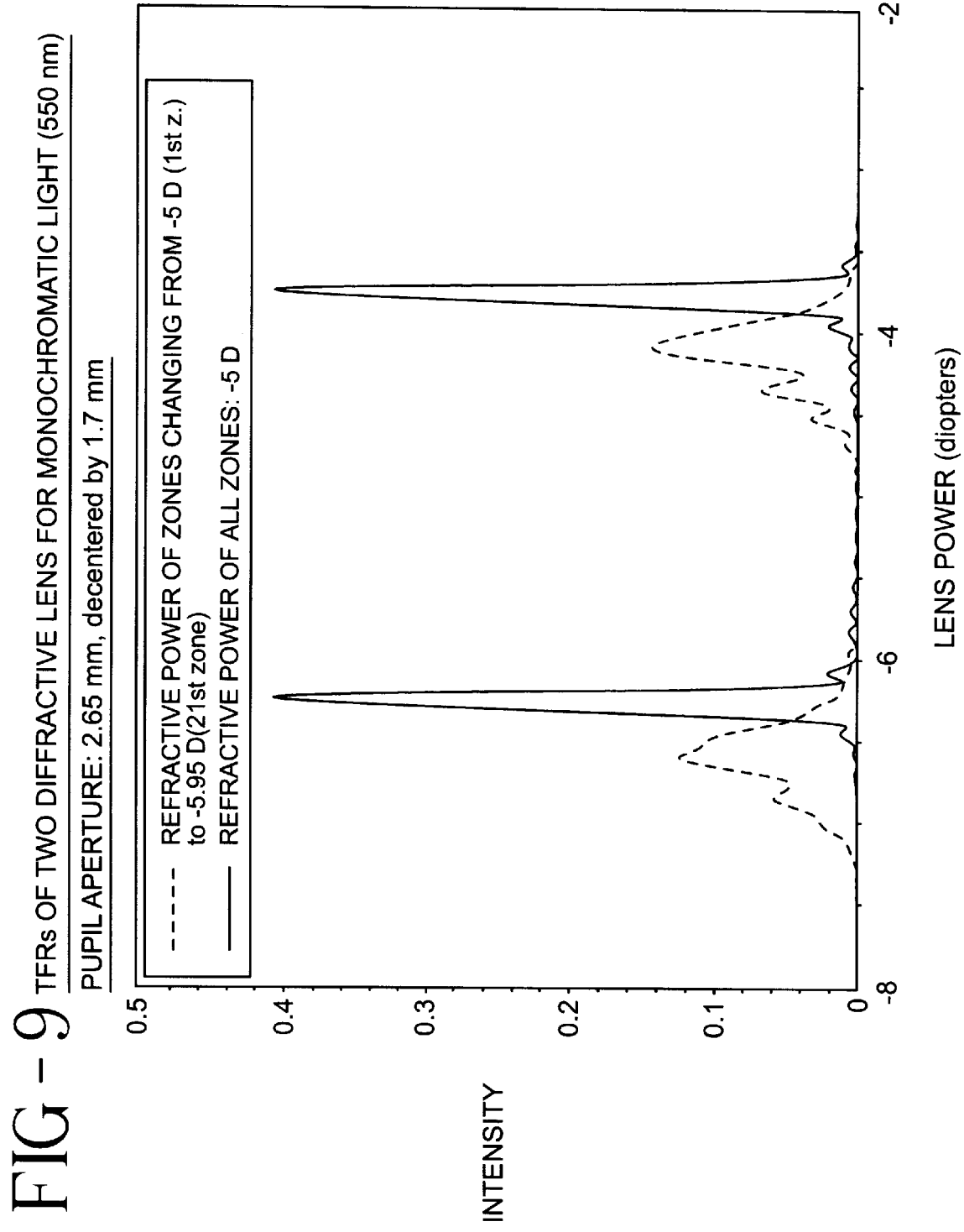

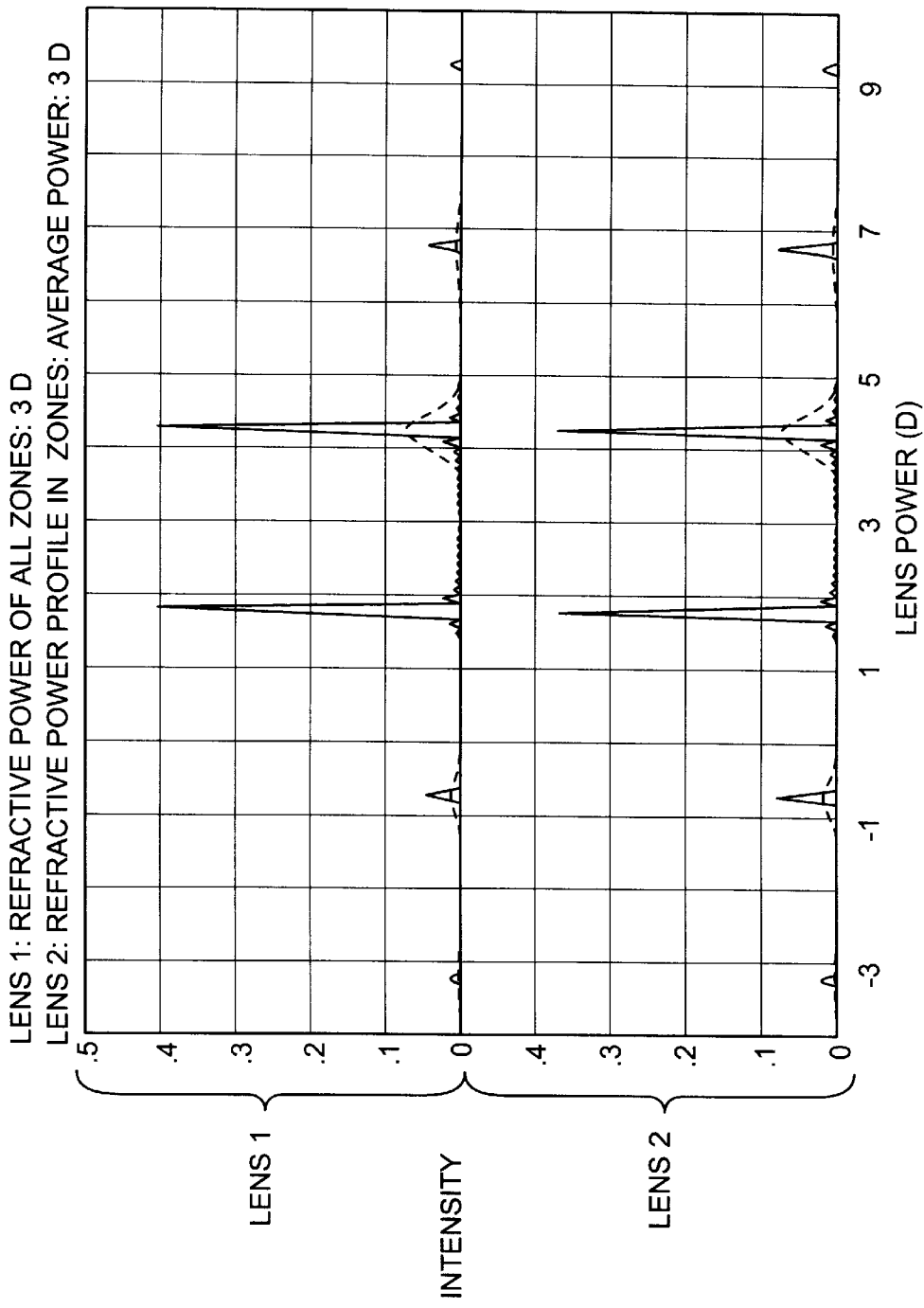
FIG-10 TFRs OF TWO DIFFRACTIVE LENSES - SOLID LINE: MONOCHROMATIC, BROKEN LINE: POLYCHROMATIC
LENS 1: REFRACTIVE POWER OF ALL ZONES: 3 D
LENS 2: REFRACTIVE POWER PROFILE IN ZONES: AVERAGE POWER: 3 D

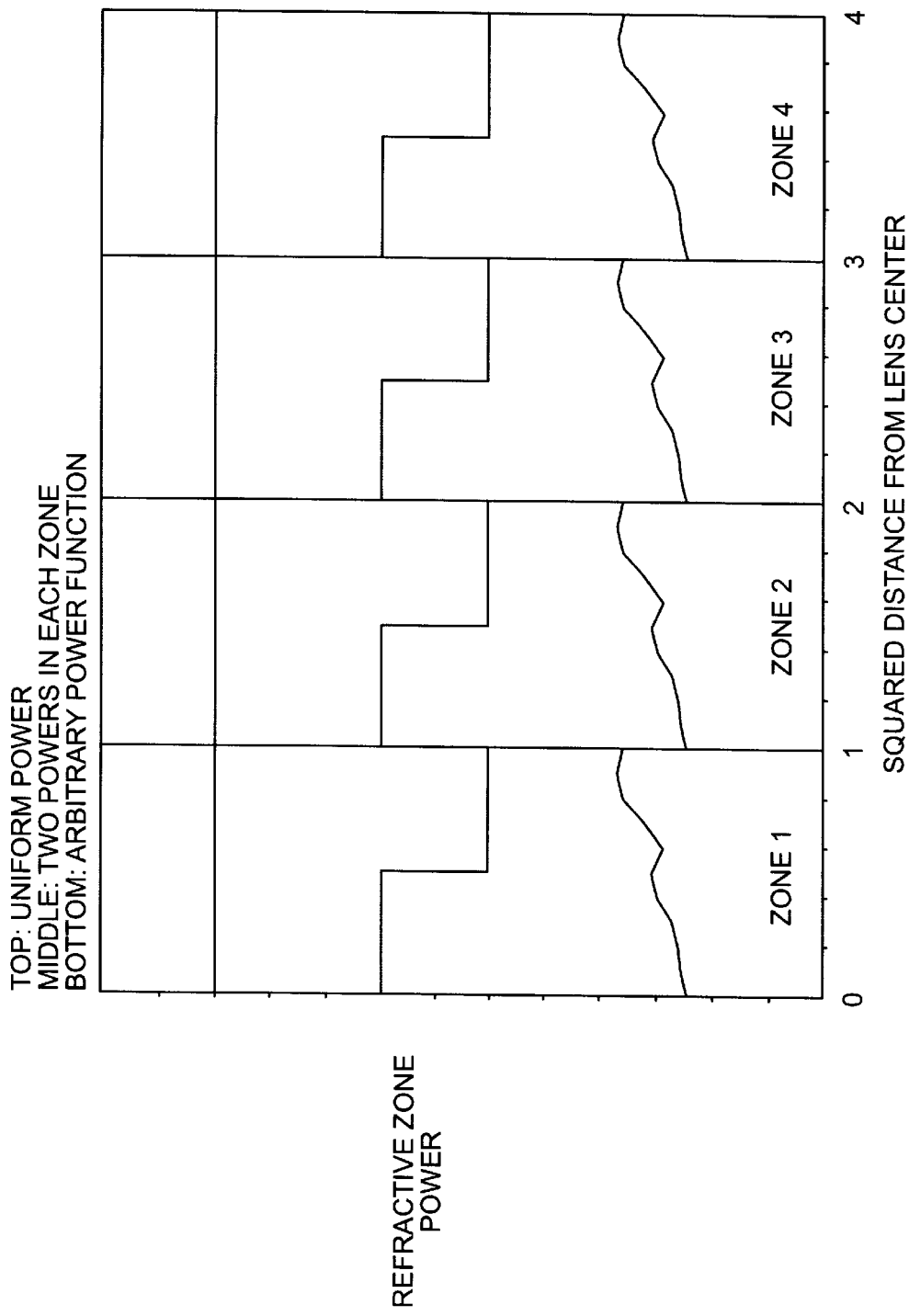
FIG-11 REFRACTIVE ZONE POWERS OF A DIFFRACTIVE LENS
TOP: UNIFORM POWER
MIDDLE: TWO POWERS IN EACH ZONE
BOTTOM: ARBITRARY POWER FUNCTION

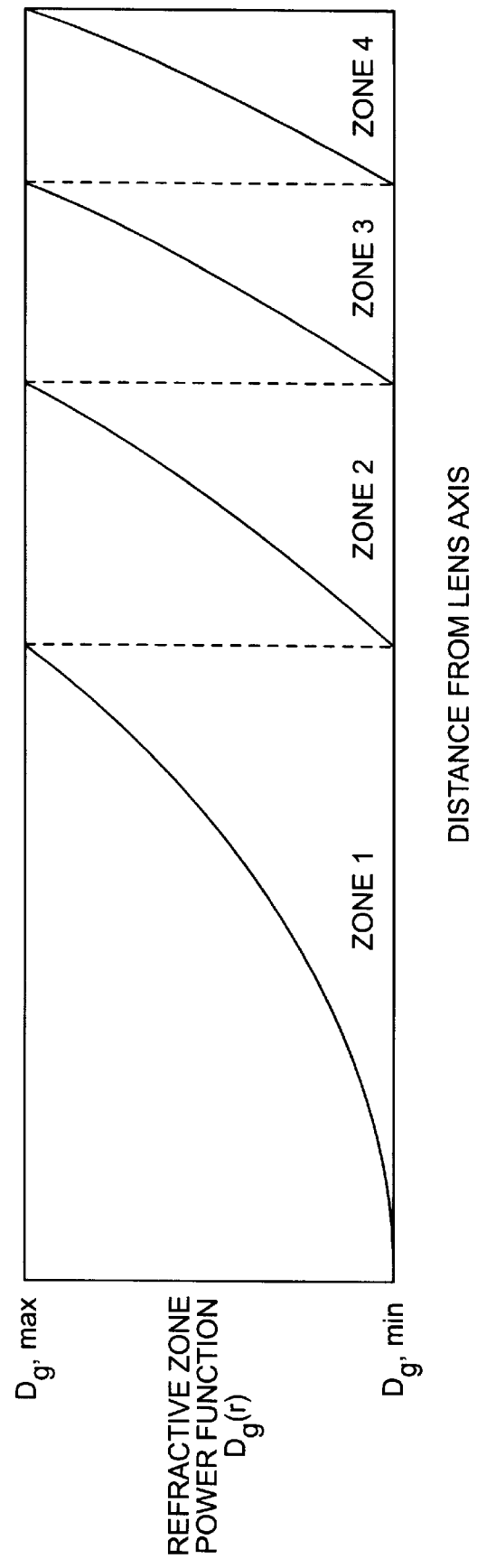
FIG-12  EXAMPLE OF A ZONE POWER FUNCTION WITH IDENTICAL AVERAGE POWERS IN ALL ZONES

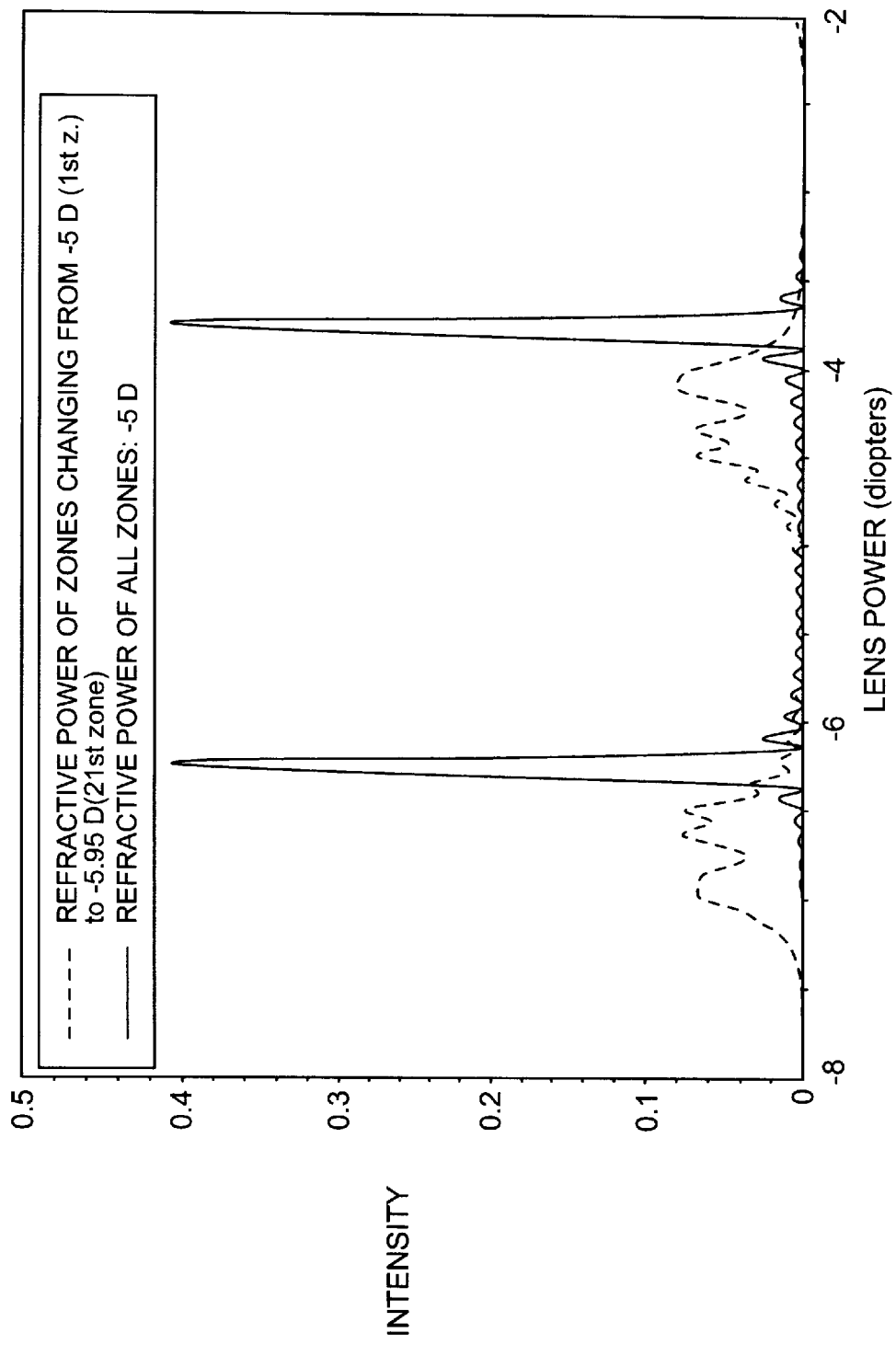
FIG-13 TFR OF A DIFFRACTIVE LENS CONSISTING OF 21 ZONES ON A 6.08 mm APERTURE STEPS BETWEEN ZONES ALTERNATING

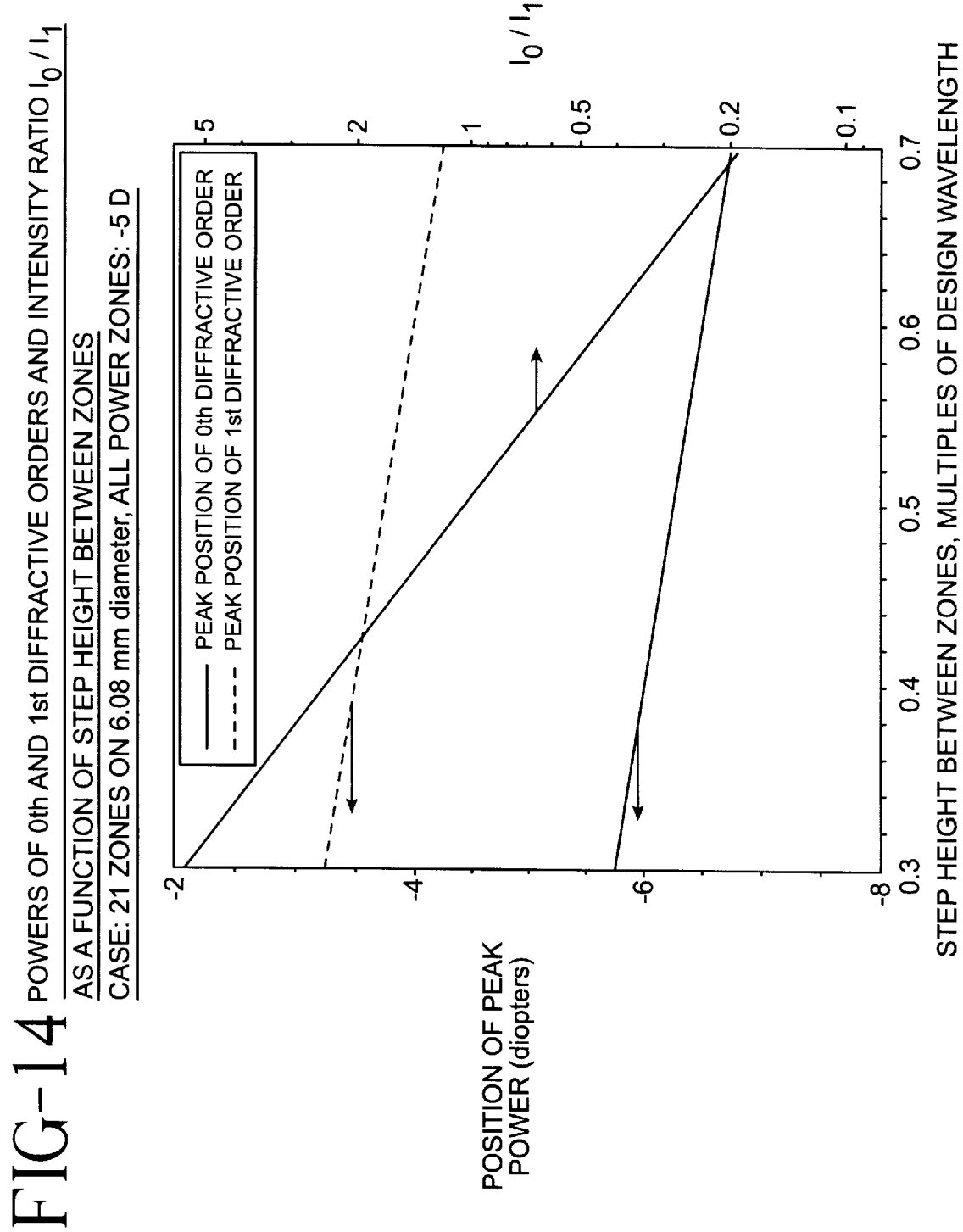
FIG-14 POWERS OF 0th AND 1st DIFFRACTIVE ORDERS AND INTENSITY RATIO $I_0/I_1$ AS A FUNCTION OF STEP HEIGHT BETWEEN ZONES
CASE: 21 ZONES ON 6.08 mm diameter, ALL POWER ZONES: -5 D

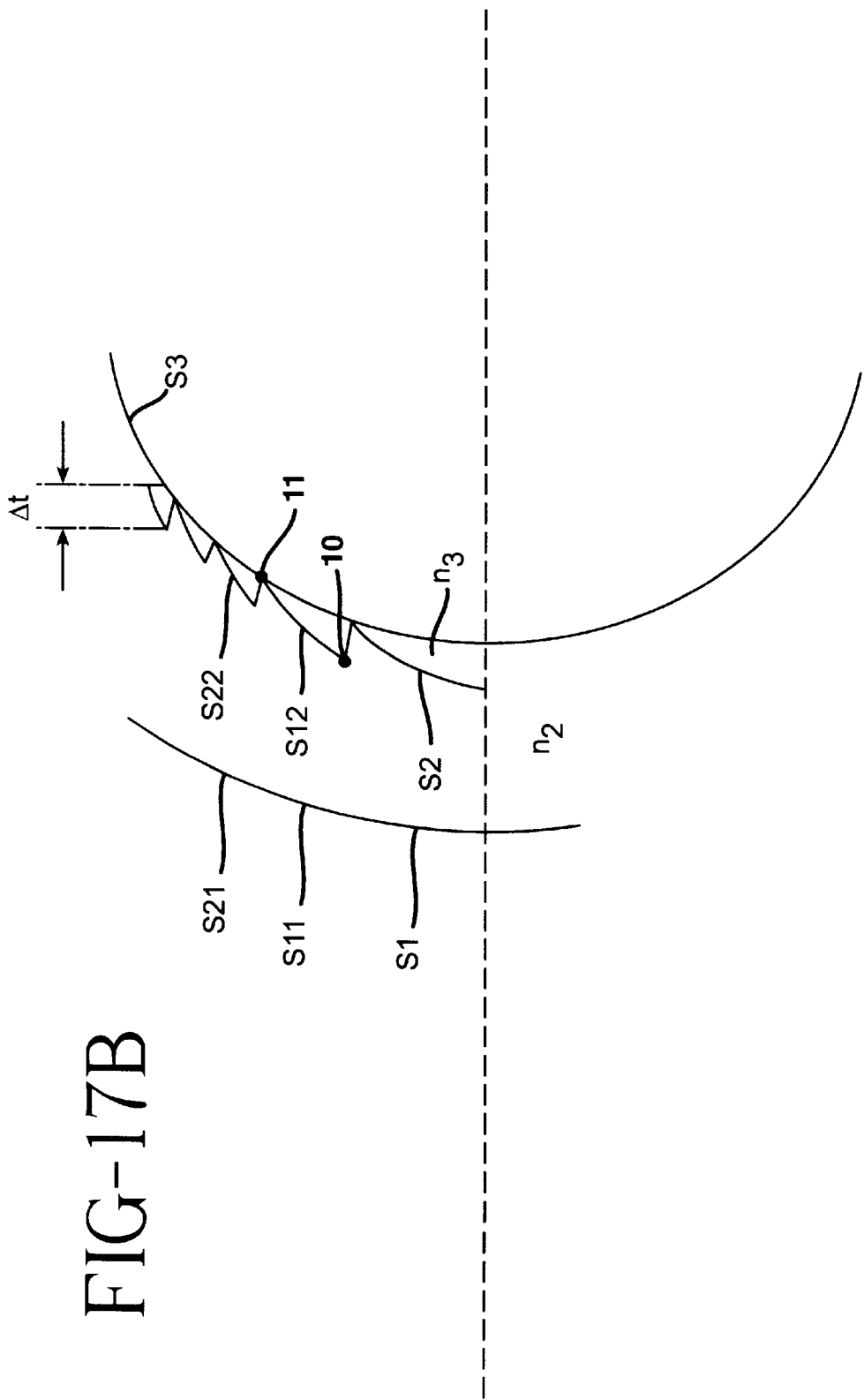

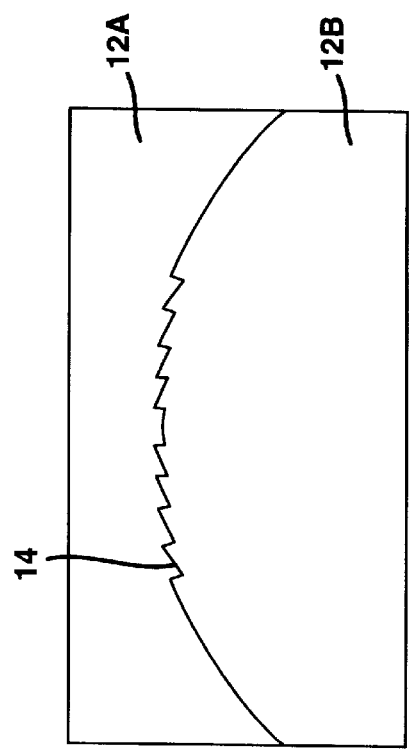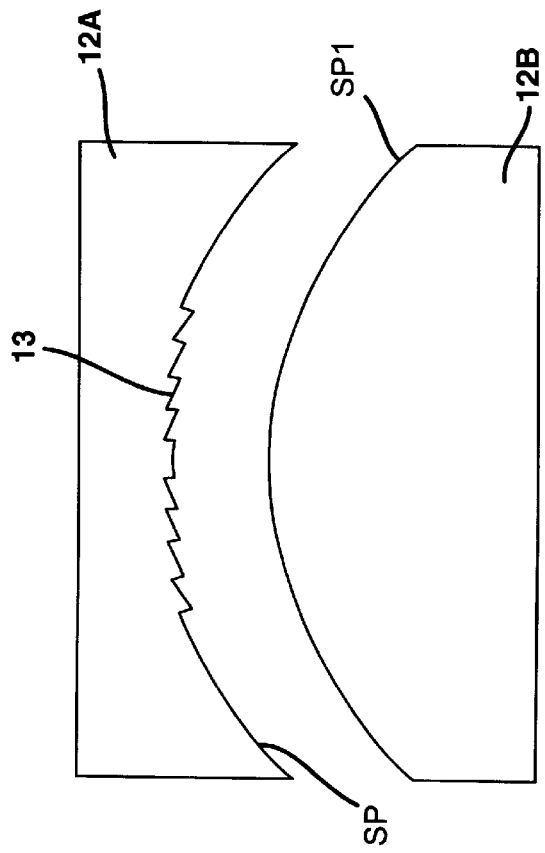

DIFFRACTIVE LENS

BACKGROUND OF THE INVENTION

1. Field of the Invention

The present invention relates generally to multifocal diffractive lenses, and more particularly relates to a multifocal diffractive lens which exhibits maximum possible intensities in the main diffractive powers and with optimum contrast performance.

2. Description of the Prior Art

Diffractive bi- and multifocal lenses are known in the art. Reference is made to the Cohen patent family and to the patents by Freeman, Futhey, Taboury and Isaacson which are discussed below.

The Cohen patent family on diffractive lenses encompasses in essence the following patents: U.S. Pat. No. 4,210,391; 4,338,005; 4,340,283; 5,054,905; 5,056,908; 5,117,306; 5,120,120; 5,121,979; 5,121,980; 5,144,483; and European Patent Application EP 0367878.

U.S. Pat. No. 4,210,391 discloses a multifocal zone plate which has first focal power means in odd zones for directing incident parallel light to a first focal point and second focal power means within even zones for directing incident parallel light to a second focal point different from said first focal point.

U.S. Pat. No. 4,338,005 discloses a phase plate construction in which the first and second focal points are specified and where the zone radii are defined as a function of a single wavelength which is termed "the wavelength under consideration". No refractive powers of the zones are discussed.

U.S. Pat. No. 4,340,283 discloses a multifocal zone plate construction in which the zone radii are defined as a function of a single wavelength and of the difference between the first and second focal powers. No refractive powers within the zones are discussed.

U.S. Pat. No. 5,054,905 discloses an ophthalmic lens comprising a carrier lens having an anterior surface and a posterior surface and a zone plate disposed about an optical axis of the carrier lens on at least one of the anterior and posterior surfaces. The zone plate includes a plurality of annular zones, wherein each of the zones has at least one echelette and each of the echelettes has a surface. The surfaces of each of the echelettes is defined as having non-uniform profiles.

U.S. Pat. No. 5,056,908 discloses an ophthalmic contact lens with a phase plate and a pure refractive portion within its optic zone.

U.S. Pat. No. 5,117,306 discloses a diffractive bifocal lens or lens system comprising a first profiled surface or interface and a second profiled surface or interface which provides for positive chromatic aberration to be associated with a first focal point and negative chromatic aberration to be associated with a second focal point.

U.S. Pat. No. 5,120,120 discloses a multifocal optical device which comprises a multifocal phase zone plate including at least two annular zones and absorbing means disposed on a portion of selected ones of the annular zones for absorbing a portion of light. The device is used for focusing light traveling parallel to an optical axis of the device.

U.S. Pat. No. 5,121,979 discloses a bifocal lens utilizing phase zone plate optics with blazed facets. Each of the facets are blazed with the same angle and a facet depth of one-half wavelength of the design wavelength.

U.S. Pat. No. 5,121,980 discloses an optical device that employs a phase zone plate comprising a plurality of blazed facets. No discussion of the blazing of the facets or the refractive powers of the facets is disclosed.

U.S. Pat. No. 5,144,483 discloses a bifocal lens utilizing phase zone plate optics and a facet depth of one-half wavelength of the design wavelength. The multiple focal point profiled phase plate having a plurality of annular concentric zones in which a repetitive step is incorporated into the profile between blazed facets. Again, a discussion of facet blazing or refractive power of the facets is not present in the disclosure.

European Patent Application EP 0367878 discloses multifocal lenses using phase shifting steps. The multiple focal point profiled phase plate includes a plurality of annular concentric zones in which a repetitive step is incorporated in the profile.

The zones, echelettes or facets of the aforementioned Cohen diffractive lens design are not zone lenses with a specified geometric power. The disclosed Cohen lenses exhibit irregularities or steps on at least one of the lens surfaces. In use, these irregularities fill with tear fluid causing interference. Mention is made that considerable effort is spent in geometric step or blaze design of diffractive lenses in order to minimize as much as possible the discomfort of lenses with alterations on the lens surface. Cohen's lens designs with smooth surfaces are occasionally discussed; however, such smooth surfaces are exclusively achieved by ion implantation within the zones. In most of the Cohen lens designs, the light incident on the lens is parallel to the optic axis of the lens. One of the Cohen lens designs discloses a refractive power.

Freeman's patent family on diffractive lenses consists in essence of the following patents: U.S. Pat. Nos. 4,637,697; 4,642,112; 4,655,565; and 4,641,934.

U.S. Pat. No. 4,537,697 discloses a bifocal contact lens which has diffractive power added to the basic refractive power. A first portion of the light is focused by refraction, and a second portion of said light is focused by asymmetric zone plate surfaces.

U.S. Pat. No. 4,642,112 discloses an artificial eye lens having basic refractive power providing one focus, and having diffractive power which deviates some light from the basic refractive power focus to another focus.

U.S. Pat. No. 4,655,565 discloses a contact, spectacle or implant lens which has positive diffractive power which introduces negative longitudinal chromatic aberration. No refractive powers of diffractive lens zones are discussed.

U.S. Pat. No. 4,641,934 discloses an ophthalmic lens which incorporates a transmission hologram having negative diffractive power which introduces positive longitudinal chromatic aberration.

Freeman's disclosed diffractive lens designs either exhibit a refractive power and an added diffractive power, or a diffractive power which introduces longitudinal chromatic aberration. No geometric powers are associated with the zone plate surfaces.

U.S. Pat. No. 4,830,481 to Futhey, discloses a multifocal ophthalmic lens which has a plurality of concentric diffractive zones with adjacent zones separated by steps having predetermined heights. No geometric powers are associated with the concentric diffractive zones, and steps separate adjacent zones.

U.S. Pat. No. 4,936,666 to Futhey discloses a lens having diffractive power, which is produced by a plurality of diffractive zones, the diffractive zones being terminated by optical steps. A first group of the diffractive zones has optical heights equal to jλ and a second group of the diffractive zones has optical heights equal to kλ, where λ is the design wavelength of light of the lens and j and k are unequal nonzero integers. No geometric powers are associated with the concentric diffractive zones, and steps separate adjacent zones.

U.S. Pat. No. 5,129,718 to Futhey discloses a diffractive lens in which the central zone is smaller than the other zones. A meniscus lens and a biconvex lens are disclosed (FIGS. 8 and 9) which exhibit smooth outer surfaces. No discussion is dedicated to the shape of these smooth surfaces, and no discussion is present about the refractive powers of the zones.

U.S. Pat. No. 5,229,797 to Futhey discloses a lens with diffractive power and two primary foci which are associated with the first and the second diffractive order. It is stated (column 6, lines 12–14) that "the radius of curvature of the base curve is a parameter in determining the optical powers of the multifocal diffractive lens". As will be shown, infra, the base curve is not the determining factor for the optical powers of a multifocal lens according to the present invention.

U.S. Pat. No. 5,104,212 to Taboury discloses a diffractive contact lens in relief including a smoothing layer. The smoothing layer is on the back surface of a contact lens with a spherical back surface. The front surface "may be constituted, for example, by a portion of a spherical surface centered on a point lying on the lens axis" (column 2, lines 40–42). No discussion of the refractive powers of the lens zones is present in this disclosure.

U.S. Pat. No. 5,152,788 to Isaacson, discloses a multifocal ophthalmic lens including a first and second lens member welded together and forming an inner cavity. A diffractive zone plate is positioned on the inner surface of one lens member. The lens members have convex, planar or concave outer surfaces, depending upon refractive optical contribution desired by the lens member. The inner surface may be planar or convex (column 4, lines 49–51). No discussion is dedicated to the shape of the inner and outer surfaces within individual zones, and, as a consequence, to the individual refractive powers of the zones.

European Patent Application EP 0468410A1 to Shiono et al., discloses a diffractive optical lens comprising a grating zone having a plurality of elliptical grooves. The lens is used to correct astigmatism. No annular lens zones of refractive power are disclosed, and, the surface of the grating zone exhibits grooves, i.e. it is not smooth.

German Patent No. DE 4134518A1 to Stork, discloses a saw-toothed diffractive lens (FIG. 5) and in particular an IOL in which the saw-toothed profile is superimposed on the common plane interface of two plano-convex lenses of different indices of refraction (FIG. 10). No annular zone lenses of refractive power are disclosed, no exact dimensions for the saw-toothed profile are given, which dimensions are not trivial since the light rays at the planar interface traverse the lens at varying angles to the lens axis. No other interface than planar between saw-toothed profiles of lenses of different indices are disclosed, and no dimensioning for the zone blazes is given.

Usually, a diffractive lens consists of any number of annular lens zones of equal areas, so-called Fresnel zones. At the common border of adjacent Fresnel zones usually +λ/2-steps or −λ/2-steps are introduced between all zones, λ being the so-called design wavelength, in order to provide for constructive interference of light waves in the 0th and 1st diffractive order, or the 0th and −1-st diffractive order, respectively. Also, diffractive lenses are known (Futhey) in which the steps between adjacent zones are any odd integer half of the design wavelength.

Besides designs in which the optical steps between zones are always positive or negative, designs with +λ/2-steps and −λ/2-steps between subsequent adjacent zones are known. In such lenses, constructive interference of light waves takes place predominantly in the −1st and +1st diffractive order. Additionally, Cohen has disclosed designs in which the steps between adjacent zones assume still other values.

Although the theory of diffractive lenses is well established and the theoretical performance of such lenses appears to be satisfactory, diffractive bi- and multifocal lenses have not found wide application e.g. in ophthalmology. This fact may be due to deficiencies of practical embodiments of such lenses, as will be explained, infra.

OBJECTS AND SUMMARY OF THE INVENTION

It is the object of this invention to provide diffractive bifocal lenses which exhibit maximum possible intensities in the main diffractive powers.

It is a further object of this invention to provide diffractive bifocal lenses with optimum contrast performance, i.e. with optimum modulation transfer functions (MTF) in their principal diffractive orders.

It is still another object of this invention to provide diffractive bifocal lenses which perform adequately in situations where the lens center and the pupil center do not coincide, i.e. in the case of a decentered pupil.

It is another object of this invention to provide a diffractive ophthalmic lens in which the bonding surface of the zones of the diffractive lens can be given a predetermined shape.

It is still another object of this invention to provide lens designs which are suitable for mass production.

In accordance with one form of the present invention, the multifocal diffractive lens includes at least two annular zone lenses. Provided between adjacent annular zone lenses is an optical step. Each annular zone lens exhibits a refractive power profile $D_{g,i}(r)$ wherein i is any i-th annular zone lens and r is the distance between an axis of the diffractive lens and a point on a back surface of the lens. The lens is further characterized in that an average power of zones i,j . . . are given by $D_{av,i}$, $D_{av,j}$ . . . respectively, and optical path lengths of light rays extending from an object point to a conjugated image point are different by the optical step for light rays transmitting through adjacent annular zone lenses. The annular zone lenses are shaped and positioned such that all of the average refractive powers $D_{av,i}$, $D_{av,j}$ . . . are essentially equal to a single value, $D_{a,v}$.

In a preferred embodiment, the refractive power profile $D_{g,i}(r)$ is a constant value which is defined by a single dioptric value $D_{av}$. The diffractive lens may also include annular zone lenses which exhibit a back refracting surface, an intermediate refracting surface and a front refracting surface. An optical medium of refractive index $n_3$ is positioned between the back refracting surface and the intermediate refracting surface and a different optical medium of refractive index $n_2$, which is not equal to $n_3$, is positioned between the intermediate refracting surface and the front refracting surface. Preferably, the back refracting surfaces of the annular zone lenses forms a single common surface which is substantially smooth. Furthermore, all points of intersection between the back refracting surface and the intermediate refracting surface preferably lie on the single common surface. In one embodiment, either the intermediate refracting surfaces of the annular zone lenses or the front refracting surfaces are spherical surfaces. In yet another embodiment, there are no geometric steps between either the back refracting surfaces of adjacent annular zone lenses or between the front refracting surfaces of adjacent annular zone lenses.

In still a further embodiment of the present invention, the multifocal diffracting lens comprises at least a central zone lens and at least one other annular zone lens. An i-th annular zone lens exhibits a minimum annular radius $r_{i-1}$ and a maximum annular radius $r_i$. An optical step is provided between adjacent zone lenses and any i-th annular zone lenses are shaped and positioned such that a refractive power across that annular zone lens exhibits a refractive power profile $D_{g,i}(r)$, such that $f(r)=D_{g,i}(r)$ is the refractive power profile of the central zone lens and the refractive power profile of the i-th annular zone lenses given by $D_{g,i}(r)=f(\sqrt{r^2-r_{i-1}^2})$, where r is the distance between a point on the back surface of the zone lens and the lens axis. The lens is further defined in that the average refractive powers of all zone lenses have substantially the same value, $D_{av}$.

In still a further embodiment, a lens is defined which includes an insert diffractive lenslet having a structure as defined with respect to the diffractive lenses earlier described, made of hard or soft lens material and a bulk optical material in which the lenslet is embedded to create a lens button. The insert lenslet is preferably made of a material having a refractive index $n_2$ and the bulk optical material is made from material having a refractive index $n_3$, which is not equal to $n_2$. The button may be finished to form a contact lens, intraocular lens or ophthalmic lens by merely shaping a front and back refracting surfaces of the bulk optical material.

A preferred form of the multifocal diffractive lens, as well as other embodiments, objects, features and advantages of this invention, will be apparent from the following detailed description of illustrative embodiments, which is to be read in connection with the accompanying drawings.

BRIEF DESCRIPTION OF THE DRAWINGS

FIG. 1 illustrates Path Length Error (PLE), ff'–ff in defocus power D.

FIG. 2 illustrates phase angle +and amplitude a as a function of PLE a

FIG. 3 illustrates the spherical aberration of a typical lens.

FIG. 4 illustrates the Through Focus Responses (TFR) of two different diffractive bifocal lenses for monochromatic light.

FIG. 5 illustrates the TFR's of two different diffractive bifocal lenses for polychromatic light spectral distribution.

FIG. 6 illustrates the Point Spread Functions (PSF) of the different diffractive bifocal lenses for monochromatic light.

FIG. 7 illustrates the Modulation Transfer Functions (MTF) of two different diffractive bifocal lenses for monochromatic light.

FIG. 8 illustrates the TFR's of two diffractive bifocal lenses for monochromatic light and a centered pupil of 2.65 mm diameter.

FIG. 9 illustrates the TFR's of two diffractive bifocal lenses for monochromatic light and a pupil of 2.65 mm diameter decentered by 1.7 mm.

FIG. 10 illustrates the TFR's of two different diffractive bifocal lenses for both monochromatic and polychromatic light.

FIG. 11 illustrates several refractive profiles (zone power) of a diffractive lens.

FIG. 12 illustrates an example of a zone power function of a diffractive lens having identical average powers in all zones.

FIG. 13 illustrates the TFR of a diffractive lens consisting of 21 zones on a 6.08 mm aperture having alternating $+\lambda/2$ and $-\lambda/2$ steps between adjacent zones.

FIG. 14 illustrates powers of the 0th and 1st diffractive orders of a diffractive lens and an intensity ratio $I_0/I_1$, as a function of step height between zones.

FIGS. 20a and b illustrate another lens button and the method of manufacturing such.

DETAILED DESCRIPTION OF THE PREFERRED EMBODIMENTS

Figure 15A:
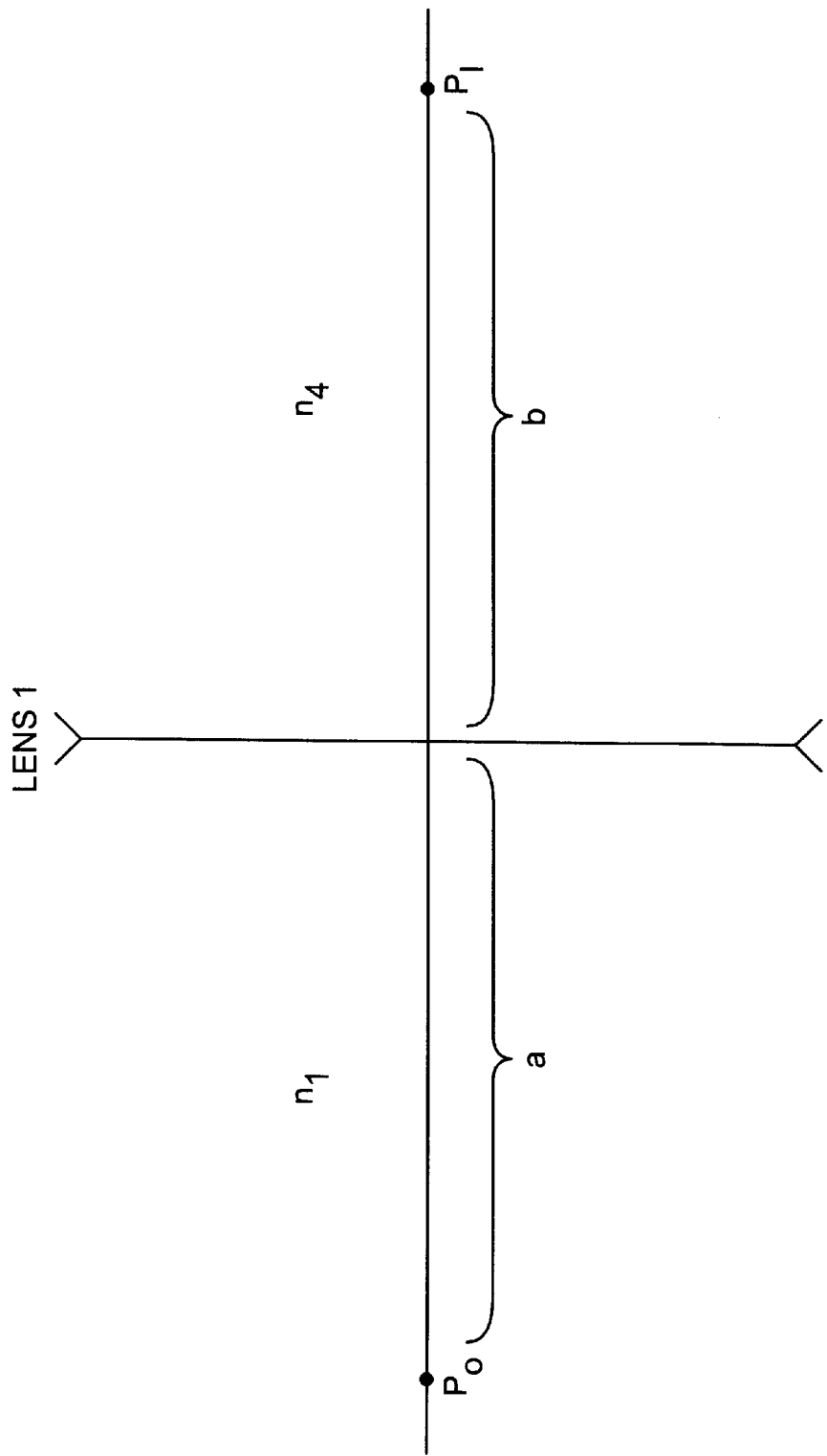
FIG. 15a illustrates the power D of a lens which produces an image point at $P_I$ of an object point at $P_O$.

In order to understand the advantages of the proposed novel lens designs, a few theoretical implications have to be introduced:

Let us assume that a lens is divided into N annular zones and the individual zones exhibit the refractive or geometric powers $D_{g,i}$. The power $D_{g,i}$ determines the location on the lens axis where the individual i-th zone—any one independent from the others—has its focus.

It is important to note that with "geometric power" or "refractive power" the power of a lens or annular zone lens is addressed which can be derived by using Snell's law of refraction in order to calculate the refracted light rays for incident light rays in parallel with the lens axis. In other words, the refractive or geometric power can be calculated purely on the basis of geometrical optics.

We now introduce optical steps between the zones with the intention to convert the lens into a diffractive lens. In order to calculate the main diffractive powers of such a stepped design lens we use the path length considerations according to Goodman (source: J. W. Goodman, Introduction to Fourier optics, McGraw-Hill, San Francisco 1968, p. 125):

By definition, the geometric or refractive power of a lens is given by $D_g=1/f$, where f is the focal distance (see FIG. 1). By analogy, for points on the lens axis a distance ff behind the lens an "effective" power D can be associated, where D is 1/ff. The path length error PLE of a lens in a point ff behind the lens is then given by (Goodman, loc. cit.):

$$PLE = ff' - ff = \frac{(D-D_g) \times B^2}{8} \quad (1)$$

where D is the effective power, Dg is the geometric or refractive power and B is the lens diameter. FIG. 1 is a schematic sketch in phase space illustrating the parameters of equation 1.

If e.g. a lens is subdivided into N annular Fresnel-type zones, all zones exhibit identical areas $$F = \frac{B^2 \pi}{4N} \quad (2)$$

and the path length error of the i-th zone is given by $$PLE_i = \frac{(D-D_{g,i}) \times F}{2\pi} \quad (3)$$

where $D_{g,i}$ is the refractive power of the i-th zone and $PLE_i$ is the difference between the paths from the position corresponding to the power D (see FIG. 1) and the outer and the inner rim, respectively, of zone 1.

The path length error of a lens or a lens zone determines both the resulting amplitude and the phase angle of the light amplitude emerging from this lens or lens zone in the point corresponding to the effective power D. First, the phase angle $\phi_i$ of the resulting amplitude can be calculated with FIG. 2, the result being $$\phi_i = \frac{2\pi}{\lambda} \times \frac{PLE_i}{2} = \frac{(D-D_{g,i}) \times F}{2\lambda} \quad (4)$$

where $\lambda$ is the light wavelength.

The resulting amplitude $a_i$ of the i-the zone is given by $$a_i = \frac{\sin(\phi_i)}{\phi_i} \times \frac{1}{N} \quad (5)$$

as can be deduced from FIG. 2. In equation 5 it is taken into consideration that every of the N zones contributes only 1/N-th to the total amplitude.

In view of the above equations 4 and 5 it is immediately evident that neither the amplitudes and, what is more important, the phase angles of the individual zones are identical in any position ff=1/D, if the geometric powers $D_{g,i}$ of the individual zones are not all the same. But identical phase angles of the amplitudes of the individual zones are a prerequisite for constructive interference of the individual zone amplitudes, i.e. for the build-up of significant intensity in one or more positions along the lens axis.

It is an object of the present invention to provide a diffractive lens consisting of any number of Fresnel-type annular zone lenses, in which all zone lenses exhibit essentially identical refractive powers.

In order to assess lenses of any kind of stepped design, it is advantageous to calculate the through focus response (TFR), the point spread function (PSF) and the modulation transfer function (MTF) of the design. To one skilled in the art these tools are familiar.

Let us now consider the case were all Fresnel zones of the lens exhibit the same refractive power $D_{g,i}$ i.e. $D_{g,i} = D_g$ for all zones i. In order to make all zone amplitudes $a_i$ parallel, optical steps between adjacent zones have to be introduced. The phase shift associated with an optical step of t is given be $$\alpha = \frac{2\pi}{\lambda} t \quad (6)$$

The optical step t has to be chosen such that the following condition is satisfied:

$$2\phi + \alpha = 2\pi \times m \quad (7)$$

where m is an integer.

Introduction of above equations 2 and 4 into equation 7 leads to $$\frac{(D_m - D_g)B^2}{8N} + t = \lambda \times m \quad (8)$$

where $D_m$ is the power associated with the diffractive order m. Introducing $p=t/\lambda$ and $$\Delta D = \frac{8\lambda N}{B^2} \quad (9)$$

we finally get for the positions of the diffractive powers the expression $$D_m = D_g + \Delta D \times (m-p) \quad (10)$$

where $\Delta D$ is the power difference between the powers of two consecutive diffractive orders and $D_m$ is the value for the power of the m-th diffractive order.

Combining the above equations to $$\phi = \pi(m-p) \quad (11)$$

and $$a = \frac{\sin \pi(m-p)}{\pi(m-p)} \times \frac{1}{N} \quad (12)$$

where a is the amplitude of every of the N annular lens zones (also the innermost zone is considered an annular zone with smaller annular radius $r_0=0$). Taking into account that the resultant amplitude of the entire lens is N×a, we finally get for the intensity $I_m$ in the m-th diffractive order:

$$I_m(p) = \frac{\sin^2 \pi(m-p)}{\pi^2(m-p)^2} \quad (13)$$

With the above restrictions it is assured that all individual zone amplitudes are in parallel. It is emphasized that the restrictions include the condition that all lens zones exhibit identical refractive power $D_g$. Equation 13 is valid for any given step height and any considered wavelength. As an example, a diffractive lens with optical steps of 800 nm between adjacent zones and incident light of 500 nm is considered. The value for p is then 800/500=1.6. Equation 13 then predicts a relative intensity of 4.3% in the 0-th order (m=0), 25% in the first order and 57.5% in the second diffractive order.

A constant refractive power in all zones will be associated with a particular geometric zone design, depending on the zone base curve and the refractive index or indices, infra, within the zones. The geometric zone design can then be calculated from the zone power $D_g$ by applying the refraction law for any ray transgressing the zone at a particular distance r from the lens axis, infra.

As is known, many different zone blaze designs were suggested, e.g. hyperbolic or parabolic or cosine profiles. In general, any zone blaze design can be associated with a refractive power function $D_g(r)$ within the zone, where r is the distance from the lens axis. The function $D_g(r)$ can be determined by applying the refractive law for a light ray transmitting the zone at a distance r from the center, see below.

Considering now a small annular lens of area $dF=2r\pi dr$ within the first zone, we get for the phase shift $d\phi_1(D)$ $$d\phi_1(D) = \frac{D 2\pi r dr}{2\lambda} - \frac{D_{g1}(r) 2\pi r dr}{2\lambda} \quad (14)$$

Integration of equation 14 leads to $$\phi_1(D) = \frac{r_1^2 \pi}{2\lambda}(D - D_{av}) \quad (15)$$

where $r_1$ is the outer annular radius of the first zone and where $$D_{av,1} = \frac{\int_0^{r_1} D_{g1}(r) r dr}{\int_0^{r_1} r dr} \quad (16)$$

is the weighted average refractive power of this zone; the expression "average power" will be used henceforth for this weighted average power (equations 16,18,20).

In order to get the same phase angle $\phi_i(D)=\phi_1(D)$ in any i-th zone, this average power has to be identical in all zones. This, as will be shown, can be achieved, if the power profile in all zones is periodic in $r^2$-space:
Consider a function $P_1(r^2)$ which is defined as $$P_1(r^2) = D_{g1}(r) \quad (17)$$

then equation 16 converts into $$D_{av,1} = \frac{\int_0^{r_1} P_1(r^2) r dr}{\int_0^{r_1} r dr} = \frac{\int_0^{u_1} P_1(u) du}{\int_0^{u_1} du} \quad (18)$$

when the transformation $u \equiv r^2$ is introduced. We now postulate that the power profile in $r^2$-space of zone 2 is given by $$P_2(u) = P_1(u - u_1) \quad (19)$$

With this we get $$D_{av,2} = \frac{\int_{u_1}^{u_2} P_2(u) du}{\int_{u_1}^{u_2} du} \quad (20)$$

$$= \frac{\int_{u_1}^{u_2} P_1(u - u_1) du}{\int_{u_1}^{u_2} du}$$

-continued $$= \frac{\int_0^{u_2-u_1} P_1(u) du}{\int_0^{u_2-u_1} du}$$

$$= D_{av,1}$$

since $u_2-u_1=r_2^2-r_1^2=r_1^2=u_1$.

In general, the power profile $P_i(u)$ in u-space (i.e. in $r^2$-space) of any zone i has to be given by $$P_i(u) = P_1(u - u_{i-1}) \quad (21)$$

or, generally $$P_i(u) = P_{i-1}(u - \Delta u)$$

where $$\Delta u = u_i u_{i-1} \quad (21')$$

in order to have the same average power $D_{av}$ in all of the zones. Thus a power function of the first zone—independent of whether a first zone is actually present in a diffractive lens or not—determines the power function of all other zones.

With power profiles of this kind within the zones the positions of the diffractive powers are given by $$D_m = D_{av} + \Delta D \times (m-p) \quad (10')$$

The intensities in the powers Dm (equation 10') of a diffractive lens with non-uniform powers in the zones are usually different from the intensities in the powers Dm (equation 10) of a diffractive lens with uniform refractive powers $D^g = D_{av}$. But the positions or values of the diffractive powers of diffractive lenses with power profiles within the zones are identical with the values of the diffractive powers of a diffractive lens with uniform and equal zone powers $D_g$, when the condition $Dg=D_{av}$ is satisfied.

The practical consequences of the above theoretical results are now discussed: consider a "normal" lens of nominal power −5 diopters and a back radius of 8 mm. These values would be typical for a contact lens. Usually, such a lens has two spherical surfaces, and using the standard thick lens formula, one would calculate a front radius of 8.74 mm if a lens material of refractive index 1.49 is used. As is known, such a lens exhibits spherical aberration, which, in general, is of lesser importance e.g in an ophthalmic lens. FIG. 3 shows the change of refractive power from center to rim of such a lens, and the spherical aberration is close to one diopter for a lens of 6 mm aperture.

If we now construct a diffractive lens by adding diffractive power to a base refractive power (as taught e.g. by Taboury, U.S. Pat. No. 5,104,212, column 2, lines 48–49, Futhey, U.S. Pat. No. 5,129,718, column 8, lines 10–12, Freeman U.S. Pat. No. 4,537,697, U.S. Pat. No. 4,642,112), supra, we may subdivide such a lens into Fresnel zones and introduce e.g. λ/2-steps between adjacent zones. When doing such, a TFR represented by the dashed function of FIG. 4 will be obtained. By comparison, the solid function of FIG. 4 represents the TFR of a diffractive lens, where all lens zones exhibit exactly the geometric power of −5 diopters.

The diffractive lens of FIG. 4 consists of 21 annular Fresnel zones on a diameter of 6.08 mm. Such a lens, as known in the art, has diffractive powers 2.5 diopters apart for a design wavelength of 550 nm (see also equation 9). As can be seen from FIG. 4, no intensity is in the refractive power of the individual annular zone lenses: Consequently it can be said that a diffractive lens according to this invention is powerless in the common uniform or average refractive power of its individual zones.

The TFR of the diffractive lens according this invention, in which all annular lenses exhibit exactly the same geometrical power of e.g. −5 D is clearly far superior to the diffractive lens, in which the annular lenses have varying geometrical powers in accordance with the spherical aberration of a normal −5 D lens. Also, the intensity of both peaks of the lens according to this invention is 40.5%=(2/π)$^2$, which is the theoretical maximum, if 100% is the peak intensity of an ideal refractive lens. By comparison, the state of the art lens exhibits only about 8% in its peaks. Also, the peaks of the state of the art lens are shifted towards more negative powers, since the annular lenses exhibit refractive powers ≦−5 diopters.

In FIG. 5 the TFR of the same lens is shown for incident polychromatic light. The spectral distribution of the incident light is considered Gaussian with peak intensity for 550 nm and 1% of this peak intensity in the wavelengths of 400 and 700 nm, respectively. As can be seen, the intensity peaks of the I st diffractive order are broadened considerably, which is just a manifestation of the well-known chromatic aberration of diffractive lenses. This broadening is more pronounced for the state of the art diffractive lens. By contrast, no broadening of the peaks is observed in the 0th diffractive order. Again, it is clearly visible that the performance of the lens according to this invention with exactly the same refractive powers in the zones is by far superior to that of the state of the art lens.

FIG. 6 shows the point spread functions (PSFs) in the viewing powers of the two lenses. The viewing power of the lens according to this invention is −6.25 D, the value −6.65 D is taken as the viewing power of the state of the art lens, since this lens has its lower peak in this dioptric position. As can be seen from FIG. 6, more intensity is directed into the side lobes in the case of the state of the art lens. From this it is to be expected that the contrast performance of the state of the art lens is poorer than that of the lens according to this invention.

FIG. 7 shows the MTFs of both discussed lenses. In this figure the individual MTFs are not-as is usually done-normalized to 1 for zero spatial frequency, in order to illustrate the differences in brightness between the two lenses. Clearly, the MTF of the lens according to this invention is the theoretical optimum, but also the MTF of the state of the art lens appears to be acceptable. The main difference between the two MTFs is relative image brightness: the MTF of the state of the art diffractive lens is comparable to some extent with the MTF of a lens of considerably smaller aperture.

This leads to the discussion of the performance of the two discussed lenses in conjunction with a small aperture or pupil. FIG. 8 shows the TFRs for the two lenses under discussion for a centered pupil of 2.65 mm diameter. For this value the four innermost zones of the lenses are instrumental for image formation. As can be seen, the TFRs of the two lenses are comparable, the powers of the state of the art lens only being shifted somewhat to more negative powers. The reason for this can be deduced from FIG. 3: the four innermost zones of the state of the art lens exhibit quite similar geometric powers, the maximum difference between the refractive zone powers being <0.2 diopters. Therefore the phase angles of the amplitudes of the four individual zones do almost agree. The fact that some of the available state of the art diffractive lenses do perform quite satisfactorily in bright daylight, i.e. with small (and centered) pupils, may be deduced from this result.

The situation changes dramatically for a decentered small pupil, as seen in FIG. 9. In the case of a decentered pupil of small aperture many of the individual zones (i.e. varying parts of individual zones) of the diffractive lens contribute to the image formation, and the different phase angles of the individual amplitudes—caused by different geometrical powers of the individual zones—lead to reduced peak intensities, when compared with the lens according to this invention.

The principal result of the above discussion is that the refractive powers of the individual annular zone lenses of a diffractive lens must be essentially equal. A proper design of the annular zones of diffractive lenses has to take into account this requirement.

The above discussion on the basis of FIGS. 4 to 9 applies to diffractive lenses according to the invention with essentially identical and uniform refractive powers within the annular zone lenses. In the case of a non-uniform refractive powers within the annular zones the condition of periodic power profiles in r$^2$-space must be satisfied according to this invention. The performance of a lens with any zone blaze design which satisfies the above restriction, i.e. D$_{av}$=const. in all annular zone lenses, is similar to the performance of a diffractive lens with uniform and identical refractive powers D$_g$=D$_{av}$ in the annular zone lenses. This is demonstrated by the results shown in FIG. 10: in this figure a diffractive lens (lens 1) having the uniform refractive power of 3 diopters in all zone lenses is compared with a diffractive lens (lens 2) in which the refractive power increases from 1 diopter at the inner to 5 diopters at the outer diameter of every annular lens. With a linear power function P$_1$(r$^2$) in zone 1 and periodic power functions P$_i$(r$^2$)=P$_1$(r$^2$−r$_{i-1}$2) the average power D$_{av}$ of every i-th zone is also 3 diopters. Both lens 1 and lens 2 comprise 21 annular zones on a 6.08 mm aperture and exhibit optical steps between adjacent zones of 275 nm; for a wavelength of 550 nm such a lens has diffractive powers 2.5 diopters apart (see equation 9). FIG. 10 shows the TFRs for incident monochromatic light of 550 nm and for incident polychromatic light; the spectral distribution of the incident light is again assumed to be Gaussian with peak intensity at 550 nm and 1% each of the peak intensity in the wavelengths of 400 nm and 700 nm, respectively. As expected, the main peaks occur at 1.75 D (0th order) and 4.25 D (1st order), side peaks are present every 2.5 diopters away from the main peaks. In polychromatic light all peaks are broadened considerably with the exception of the 0th order peaks. This broadening is a manifestation of the chromatic aberration of diffractive lenses. As expected, the intensity distribution over the various peaks is different for the two lenses, but the positions of the peaks are identical for both lenses, in agreement with equations 10 and 10'.

From FIG. 10 it can be deduced that particular zone blaze designs can be used in order to direct more intensities to higher diffractive orders. According to this invention, all possible blaze designs have to satisfy the condition of essentially identical average refractive powers D$_{av}$ in all of the annular lenses, D$_{av}$ being given by $$D_{av} = D_{av,i} = \frac{\int_{r_{i-1}}^{r_i} D_{g,i}(r) r \, dr}{\int_{r_{i-1}}^{r_i} r \, dr} \tag{16'}$$

where r is the distance from the lens axis, r$_{i-1}$ is the radius of the inner rim of the i-th zone and r$_i$ is the radius of the outer rim of the i-th zone, D$_{g,i}$(r) is the power function within zone i.

In summary, the point of the present discussion is the following: geometric zone blaze designs of any kind, e.g. parabolic, hyperbolic or spherical, are known. The above discussion shows that the geometric zone blaze design is not essential in the first place for a proper performance of a diffractive bi- or multifocal lens. By contrast, it is important that the average refractive zone powers (equation 16') of all zones are essentially identical, and from this restriction the adequate geometric zone blaze design of every single zone has to be derived. In particular, it is proposed that the average individual zone powers are uniform zone powers, since such is relatively easy to realize in practice, infra. FIG. 11 shows some refractive power functions within the zones in $r^2$-space according to the present invention.

In general, the power function in r-space of the i-th zone is given according to this invention by $$D_{g,i}(r) = f(\sqrt{r^2 - r_{i-1}^2}) \tag{22}$$

where $$f(r) = D_{g,1}(r) \tag{23}$$

is the power function in r-space of the first zone and $r_{i-1}$ is the inner annular radius of the i-th zone.

As an example, zone 1 in FIG. 12 has a spherical power function following the equation $$D_{g,1}(r) = D_0 - \sqrt{D_0^2 - kr^2} \tag{23'}$$

where $D_0$ and k are constants. The power function of the i-th zone is then given by $$D_{g,i} = D_0 - \sqrt{D_0^2 + kr_{i-1}^2 - kr} \tag{22'}$$

The diffractive lenses discussed so far had identical optical steps (usually $\lambda/2$-steps) between adjacent annular zone lenses; and it was shown that it is important that all individual uniform or average zone powers are identical. This requirement is also valid for other step designs between the zones of a diffractive lens.

In FIG. 13 the TFR for a lens is shown, which has alternating $+\lambda/2$ and $-\lambda/2$-steps between adjacent zones. Such a lens, as is known, has the two principal powers in the $-1$st and $+1$st diffractive order. As can clearly be seen, it is important also for diffractive lenses of this design that the uniform or average refractive powers of the individual zones are essentially identical.

Investigations of other diffractive lenses with still other step designs including the cases where the step heights increase or decrease across the entire diffractive lens have shown that the above requirement is valid in general for multifocal diffractive lenses.

The above requirements apply in particular also for diffractive lenses, in which one of the principal intensities is favored over the other. As is known, such is achieved by introducing steps between the zones which are not half the design wavelength. For completeness, one result of such calculations is represented in FIG. 14. The lens discussed is one in which the two main powers are in the 0th and the 1 st diffractive order. With decreasing optical step between the zones the dioptric position of the 0th order peak is shifted towards the refractive power of the individual zones and the intensity of the 0th order is the more favored over that of the 1st order, as can be seen from FIG. 14. The difference AD between the two principal powers is constant, since, for a given wavelength $\lambda$, this difference depends solely on the number N of Fresnel zones on a lens aperture B, i.e.

$$\Delta D = \frac{8\lambda N}{B^2} \tag{9'}$$

where $\lambda$ is the design wavelength.

The function $I_1/I_0$ can be verified on the basis of equation 13 by giving m the values 0 and 1 and by setting $0.3 < p < 0.7$.

The rest of this disclosure is dedicated to the demonstration, how the above considerations or restrictions can be advantageously put into practice.

As is known, the power D of a lens 1 (see FIG. 15$a$) which produces an image point in position $P_I$ of an object point in position $P_O$ is given by $$D = \frac{n_1}{a} + \frac{n_4}{b} \tag{24}$$

where $n_1$ is the index in front of the lens, and $n_4$ the index in the back of the lens.

For a diffractive lens according to this invention with equal and uniform refractive powers in the zones, the following conditions must be satisfied:

1. Any ray originating in $P_O$, transmitting through any part of the zone lens and directed into $P_1$ has to satisfy the refraction laws at any boundary between two different optical media.
2. The optical path lengths of all rays through this zone lens between $P_O$ and $P_I$ must be identical.

Let us consider (FIG. 15$b$) a small zone of a lens in which a medium of index $n_3$ is between the surface elements S2 and S3, and a medium of index $n_2$ between the surface elements S1 and S2. The indices in front and behind this zone lens are $n_1$ and $n_4$, respectively. The distance of the image point $P_I$ conjugated with the object point $P_O$ depends on the shape of the three surface elements and on all the refractive indices.

If we let e.g. all indices, the object position and the two surfaces S1 and S2 constant and change S3, we will get a different image point position, and consequently a different refractive power of the lens zone. But this is equivalent to saying that for a given refractive power, and, consequently, for two given conjugated object and image distances, and for given surfaces S1 and S2 a proper surface S3 can be found such that a light ray emerging from the object point $P_O$ is refracted by the lens zone into image point $P_1$.

In general, for a lens zone consisting of three refracting surfaces with different refractive indices being present between the first and second and the second and third surface, respectively, it is possible with any two given surfaces to determine the third surface such that the lens zone exhibits a desired refractive power. By way of example, the intermediate and the back refracting surfaces S2 and S3, respectively, of an annular lens (FIG. 15$b$) are given; then the front refracting surface S1 can be calculated such that the annular lens has a desired power $D_g$ which determines the conjugated object and image points, and that the optical path length $$OPL = a' \times n_1 + t_1 \times n_2 + t_3 \times n_3 + b' \times n_4 \tag{25}$$

is also a desired value. OPL can be varied by varying the coordinates of point 3 of the surface S1.

Figure 15B:
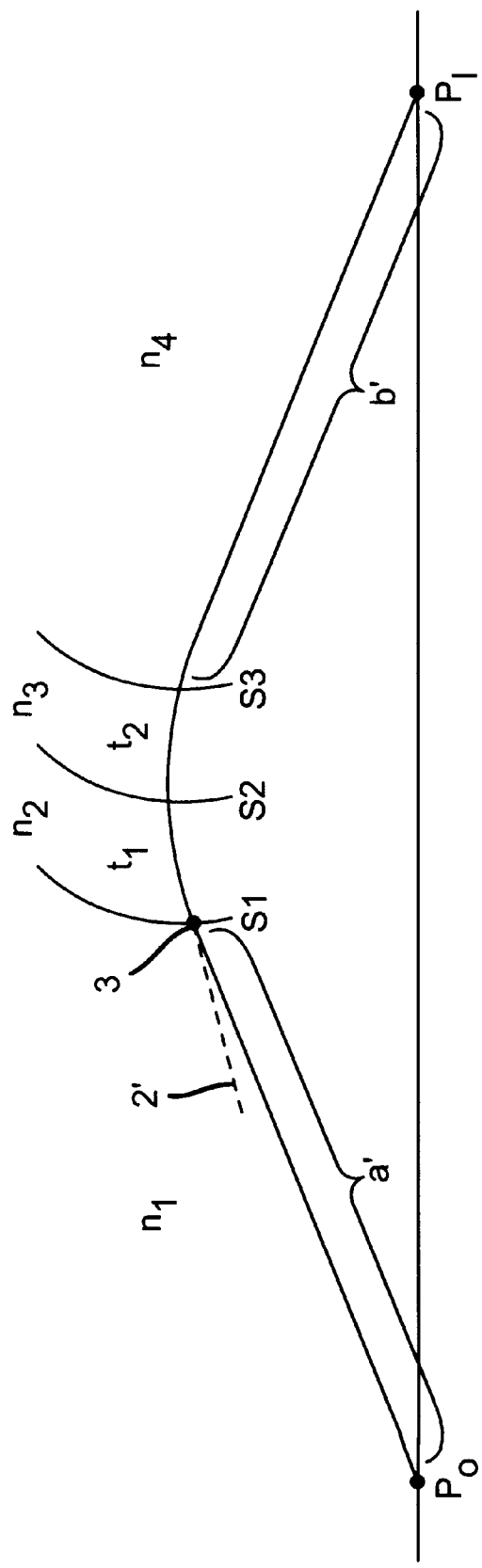
FIG. 15b illustrates the image point $P_I$ and object point $P_O$ of a small zone of a lens having surface elements S1, S2 and S3.

The meaning the symbols can be taken from FIG. 15$b$. (Note: In the following the symbols for the surfaces are used according to this convention: S1, S11, S21, S31 . . . are front refracting surfaces, S2, S12, S22, S32 . . . are intermediate refracting surfaces, and S3, S13, S23, S33 . . . are back refracting surfaces of annular zone lenses.)

Figure 16:
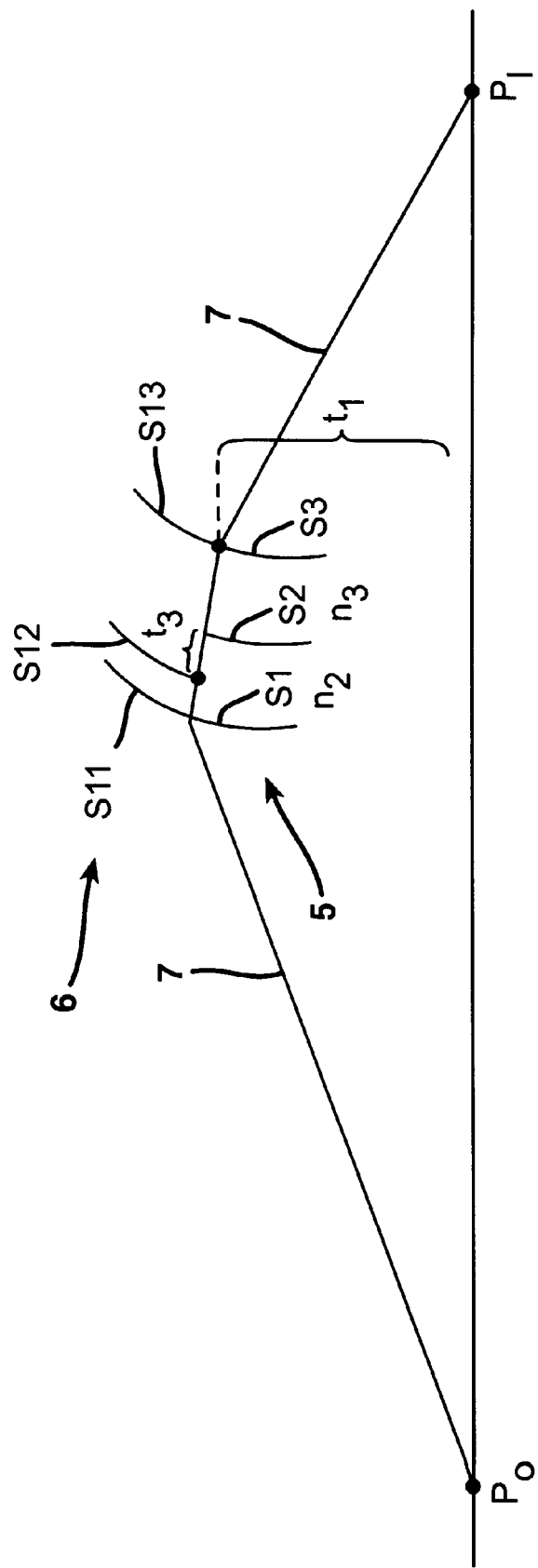
FIG. 16 illustrates two diffractive lens zones positioned adjacent one another and the resulting optical path lengths of rays therethrough.

We now consider, in FIG. 16, the case where a lens or annular lens 5 of outer radius $r_1$ is adjacent to another annular lens 6. The optical path length OPL6 of any ray through lens 6 should be larger by an amount $\Delta t$ than the optical path length OPL5 through lens 5. By way of example, we consider the case where $n_3$ is larger than $n_2$.

We first construct the outer border ray 7 of annular lens 5 according to the above considerations. Then the innermost point on the intermediate surface S12 of lens 6 is a distance t3 along this border ray in front of the outermost point on S2 of lens 5, where $$t_3 = \Delta t/(n_3 - n_2) \quad (26)$$

The back surface S13 of lens 6 may be identical with S3, but can also be different. S12 can exhibit an arbitrary shape, in principle; usually S12 will be made similar to S2.

Having now the optical path length OPL6=OPL5+$\Delta t$ we can construct the front refracting surface S11 in agreement with the considerations presented before.

With this the different annular zone lenses of a diffractive lens can be constructed such that following requirements are fulfilled:

a. All zone lenses exhibit essentially the same refractive power.
b. The optical path length of rays extending from the object point PO to the image point $P_I$ and transmitting adjacent lens zones, are different by a desired value $\Delta t$.

As mentioned, the described method applies to any kind of lens back surfaces S3, S13, . . . and any combination of refractive indices. In particular it applies also to the construction of a diffractive bifocal intraocular lens, where typically the lens back refracting surface is convex and where the indices $n_1$ and $n_4$ are usually given the value 1.336.

Figure 17A:
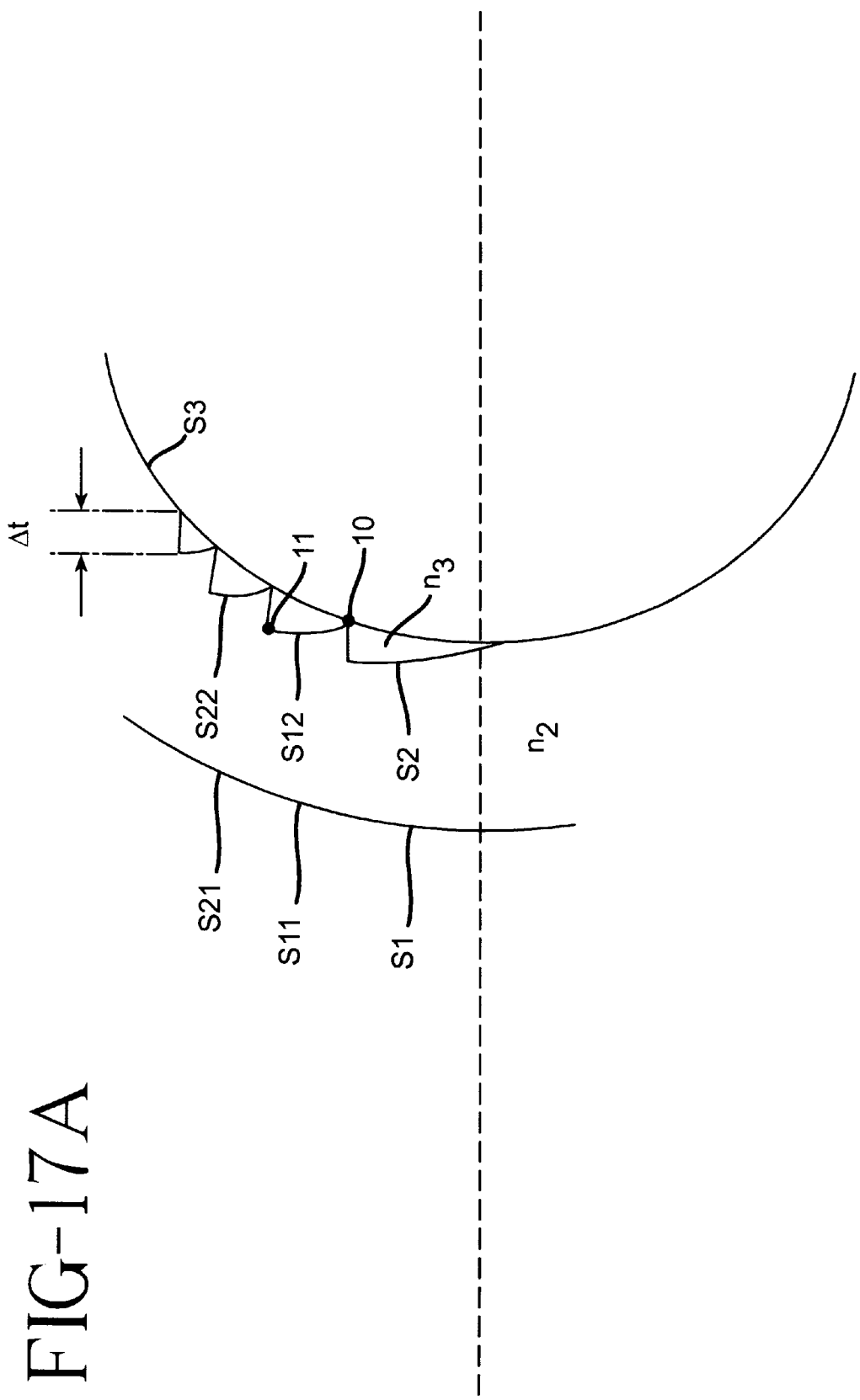
FIGS. 17a and b illustrates a diffractive lens having a geometry in which corners of the stepped zones are bonded to a spherical surface.

A case of special interest is a geometry where the corners of the stepped zones of a diffractive lens are bonded e.g. by a spherical surface S3, see FIG. 17. In this configuration the intermediate surfaces can e.g. be spherical wherein the centers of the spheres lie on the lens axis, the radius of any of the intermediate zone surfaces being determined by the two points 10 and 11. FIG. 17a and FIG. 17b show two possible designs: if the material within the steps has an index $n_3 > n_2$, the optical path length difference between the i-th and the i+1-th zone decreases in the design according to FIG. 17a, and increases in the design according to FIG. 17b. The situation is reversed for $n_3 < n_2$. As is known, the first diffractive order represents the higher power, if the optical path length increases from zone i to zone i+1. For a decrease of optical path length from zone i to zone i+1 the power of the 0th order is the larger of the two powers.

Figure 18:
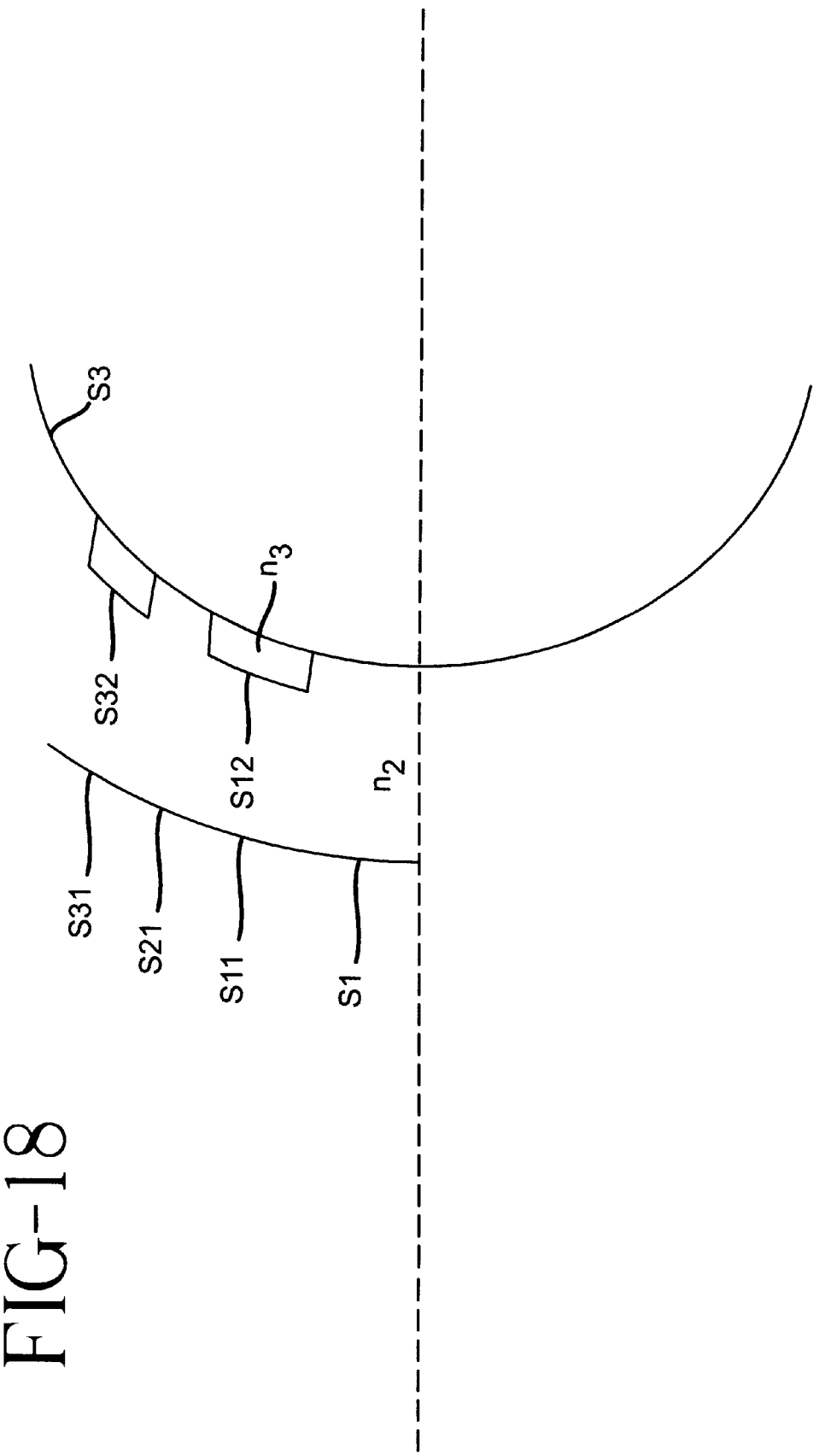
FIG. 18 illustrates a cross-section of a diffractive bifocal lens in which the two principal powers are associated with the −1st and +1st diffractive order.

FIG. 18 shows a section of a diffractive bifocal lens in which the two principal powers are associated with the −1st and +1st diffractive order. Again, the back surface S3 can be made smooth across the entire lens area, the intermediate surfaces S12, S32 . . . can be spherical, and the front surfaces S1, S11, S21 . . . are fitted curves; the entire front surface of the lens is therefore a smooth multicurve, in general.

As explained, the front surface of a diffractive lens according to this invention will be a smooth multicurve wherein the zone front surfaces are S1, S11, S21 . . . . But since it is permissible to allow for a power error of appr. 0.1 diopters within each zone (see FIG. 8 for comparison) it may be possible to approximate the front surfaces S1, S11, S21 . . . of the individual zones with a sphere or with an aspherical or with a polynomial function.

As will be understood, the optical steps can as well be positioned on the front surface of a diffractive lens rather than on the back surface, as shown in FIGS. 17a and 17b. Formally, the image point and the object point simply have to be swapped and the indices changed accordingly in order to be able to apply the above arguments also for diffractive lenses with steps on the front surface.

Finally, if a lens zone should be characterized by a power function according to equation 22, such a lens zone can be subdivided into any number of annular subzones, where each subzone has a given power according to the power profile. Then each subzone of the lens zone can be dimensioned according to the above considerations. The optical path lengths associated with the different subzones of a lens zone are not equal any more for a lens zone with a power profile. Due to this, an additional degree of freedom is available for designing purposes, and this degree of freedom can be used to make the transitions of all three refracting surfaces smooth between adjacent subzones.

Since an arbitrary number of subzones can be introduced in a zone lens, the above calculation can be done to an arbitrary degree of accuracy.

An example for the actual embodiment of a contact lens is now given. The lens design is that of FIG. 17a, the indices $n_2$ and $n_3$ are 1.44 and 1.40, respectively. The (entire) back surface S3 is spherical with a radius $R_3$=8.6 mm. The geometrical step height is 6.87 micron, corresponding to an increase in optical path length of +275 nm between any inner and outer annular lens zone. The lens is designed to exhibit the powers −6.25 D for viewing and −3.75 D for reading. Consequently, the refractive power of all zones is −5 D. The center thickness of the lens is 0.1 mm; the rim thickness at the edge The last zone is 0.154 mm. Table 1 gives the key parameters of this lens:

TABLE 1

| zone # | spherical front radius (S1, S11 . . . ) | spherical intermediate r. (S2 . . . ) | outer annular front radius | outer annular back radius |
|---|---|---|---|---|
| 1 | 9.823 | 11.746 | .665 | .663 |
| 2 | 9.813 | 11.717 | .941 | .935 |
| 3 | 9.804 | 11.688 | 1.153 | 1.149 |
| 4 | 9.795 | 11.659 | 1.331 | 1.327 |
| 5 | 9.786 | 11.630 | 1.489 | 1.483 |
| 6 | 9.777 | 11.602 | 1.631 | 1.625 |
| 7 | 9.768 | 11.573 | 1.762 | 1.755 |
| 8 | 9.759 | 11.545 | 1.884 | 1.876 |
| 9 | 9.750 | 11.516 | 1.998 | 1.990 |
| 10 | 9.741 | 11.488 | 2.106 | 2.098 |
| 11 | 9.732 | 11.460 | 2.209 | 2.200 |
| 12 | 9.723 | 11.431 | 2.308 | 2.298 |
| 13 | 9.714 | 11.403 | 2.402 | 2.392 |
| 14 | 9.706 | 11.375 | 2.493 | 2.482 |
| 15 | 9.697 | 11.347 | 2.581 | 2.569 |
| 16 | 9.688 | 11.320 | 2.666 | 2.653 |
| 17 | 9.680 | 11.292 | 2.749 | 2.735 |
| 18 | 9.671 | 11.264 | 2.829 | 2.814 |

As is apparent from Table 1, the annular zone radii are slightly larger on the front surface than on the back surface. As seen, normal spheres are used to represent all individual zone surfaces. With such fits the calculated error in refractive power of the zones varies from 0.035 D for the first zone to 0.038 D for the 18th zone. As will be appreciated, such power errors are totally acceptable.

Lenses of this kind can be produced e.g. by consecutive molding processes, forming, first, the stepped surfaces S2, S12, S22, S32 . . . and then the final surface S23. As can be appreciated, the front surface is a smooth multicurve, and the individual zone front radii are very similar. The back surface is smooth and spherical with just one radius across the entire lens area.

The advantages of such lenses are high wearing comfort, and, of course, superior optical performance. The lens of table 1 does not have chromatic aberration in the viewing power, which is considered an advantage, in contradiction to other authors (e.g. Futhey).

The lens according to FIG. 17a and table 1 is a typical example of a soft contact lens, which drapes over the cornea of the eye. As is known in the art, only a few different base curves are required in order to fit the entire spectrum of human corneal radii.

In the case of rigid diffractive contact lenses, it is required that the lens back radius corresponds rather exactly to the human cornea. Since the market for RGP contact lenses is rather small by comparison, high investments in production techniques are considered to be prohibitive. Consequently, a different production technique for diffractive RGP lenses is proposed.

Figure 19:
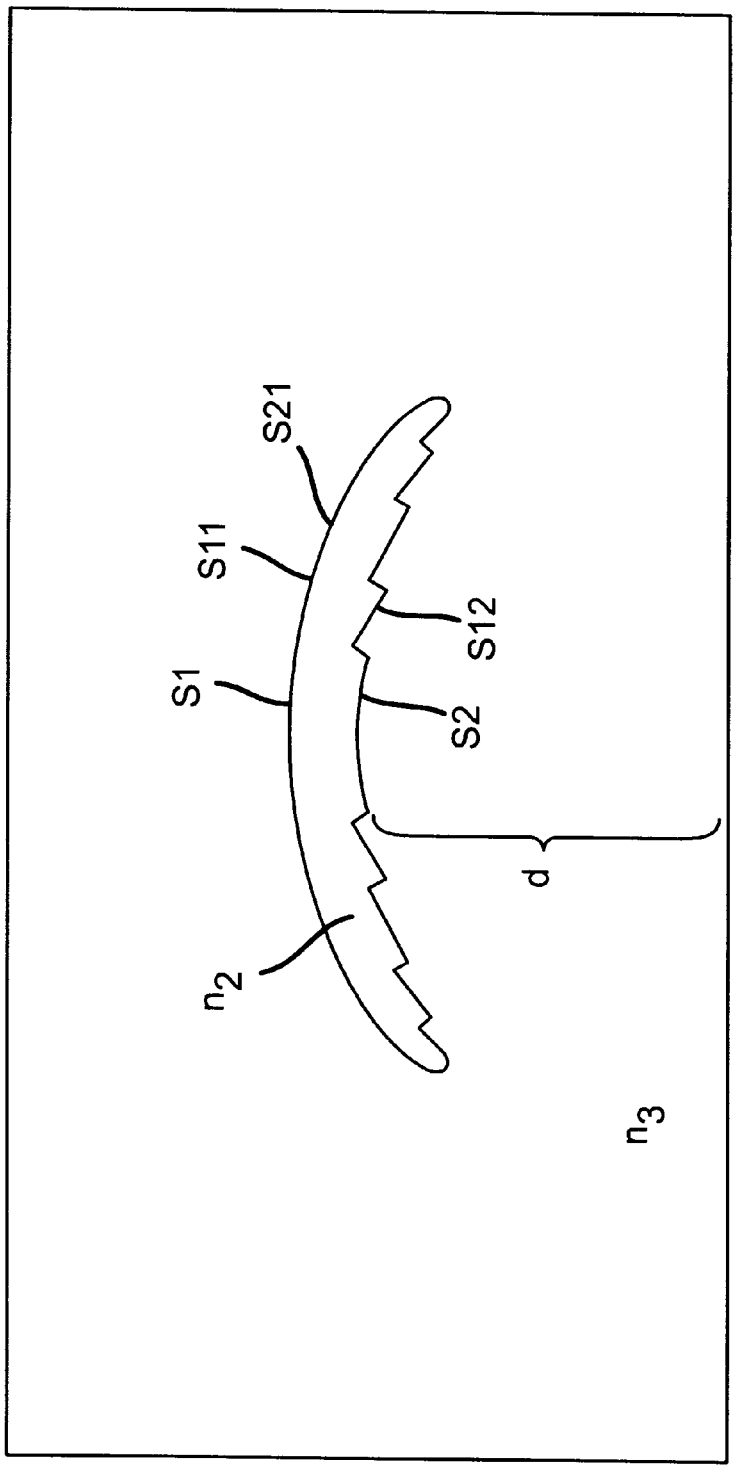
FIG. 19 illustrates a lens button which includes therein a diffractive lenslet.

A lenslet according to FIG. 17a or 17b with a viewing power of e.g. 0 D and a reading add of e.g. 2.5 D—when measured in air—can be incorporated in a usual lens button. The index $n_2$ of this lenslet needs to be different from $n_3$ by a rather small amount only, where $n_3$ is also the index of the button material. The back surface S3 of the insert lens can be a uniform value, e.g. 8.6 mm, the diameter should correspond to the maximum pupil aperture, e.g. 6 mm. Such an insert lens will be very thin, in the order of 0.1 mm or smaller over its entire area. FIG. 19 shows an example of such a lens button with an incorporated diffractive lenslet.

As mentioned, supra, the lens can be designed such that the corners of the stepped zones are bonded by e.g. a spherical surface, see FIGS. 17a and 17b. With this, a lens button which incorporates a diffractive lenslet can also be produced as follows:

A female part 12A of a lens button 12 exhibits on one surface a diffractive structure 13 consisting of stepped zones; the corners of said stepped zones are bounded by a surface SP which may be a spherical surface. The male part 12B of a lens button 12 exhibits a surface SP' which is complementary to surface SP; see FIG. 20. both 12A and 12B can be produced e.g. in a molding process. Part 12A and 12B are then glued together by a glue 14 which may be a lens material similar to the lens material of 12A or 12B. The refractive index of the glue 14 has to be different from the refractive index of part 12A by at least a small amount. If the button materials are soft lens materials, the glue 14 should have similar or identical expansion factors. When the two parts 12A and 12B are glued together at their common or complementary surfaces, glue 14 will fill the small cavities of the diffractive structure 13.

In principle, the lens materials of part 12A and 12B can be different, but it will be practical to use the same lens material in both part 12A and 12B; then the insert lenslet consists just of the glue within the cavities of the diffractive structure 13. A finished contact lens can be the cut from such a lens button 12 in a fashion which is similar with cutting a lens from a button according to FIG. 19.

The lens producer has to know the exact position of the lenslet, e.g. the distance d between the apex of the lenslet and the lower plane surface of the button. He is then able to cut the required lens back surface. From the known thickness of the lenslet he can determine the allowable minimum center thickness of the finished lens.

On the basis of software in accordance with the described lens dimensioning method, the front multicurve surface of the finished lens can be calculated for any required viewing power and any wanted back radius of the finished lens: in the case of a 2.5 D add power, the refractive power of all zones of the finished lens has to be the required viewing power +1.25 D. Instead of cutting a multicurve front surface, an aspheric fit may also be acceptable.

Figure 21:
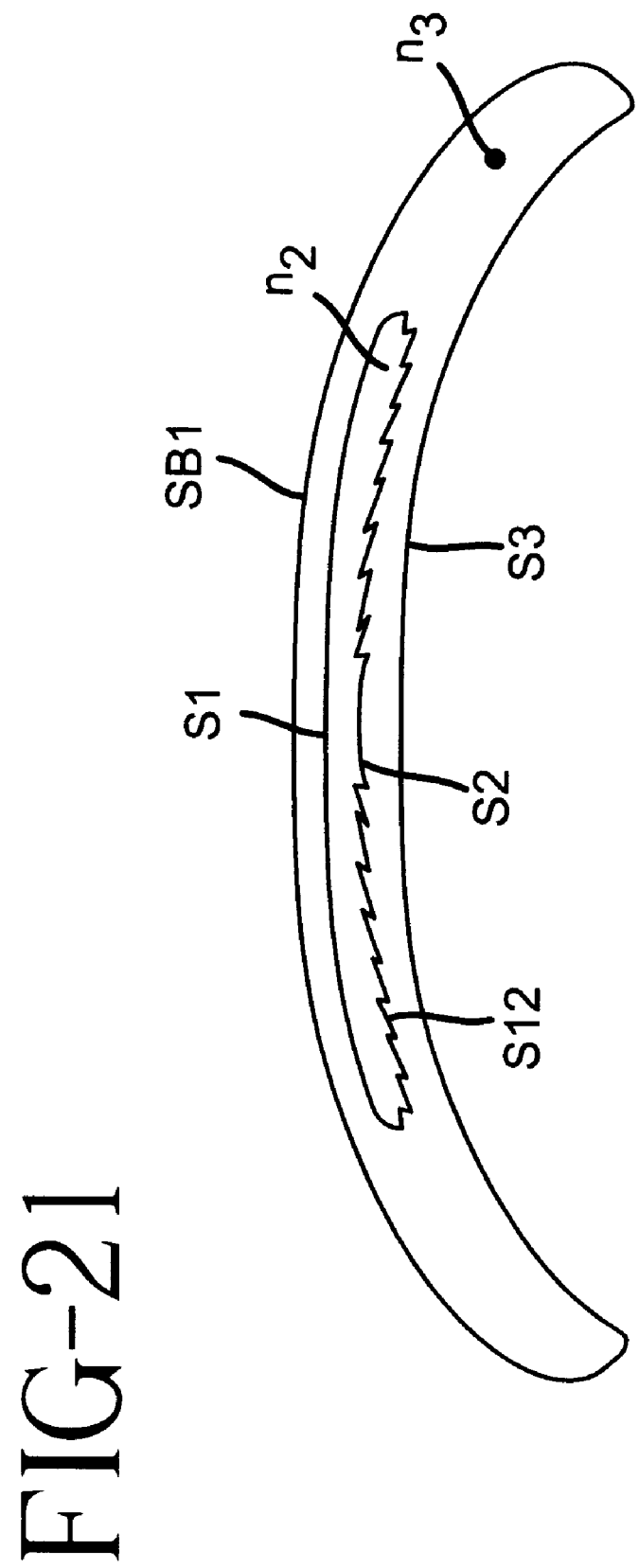
FIG. 21 illustrates a contact lens cut from a lens button as shown in FIG. 19.

In FIG. 21 a contact lens cut from a button according to FIG. 19 is illustrated. The lens producer has to cut the back refracting surface S3 and the front refracting surface SB1. It should be noted that the front refracting surface SB1 is different from the front refracting surface S1 of the insert lens of the button and that an additional material of index $n_3$ is positioned between the surfaces S1 and SB1, respectively.

As will be appreciated, the above considerations apply also for hydrophilic buttons. The dimensions of the insert lenslet have to be scaled down in accordance with the expansion factors of the hydrophilic material of the lenslet and the button. These factors, as is obvious, should be identical or at least similar. The expansion factor(s) may also assume the value 1, as is the case e.g. in wet molding processes.

The above considerations for pre-fabricated lens buttons apply, as will be appreciated, both for contact lenses and intraocular lenses.

For illustration purposes, the key dimensions of a few contact lenses are presented, which can be manufactured from a prefabricated lens button according to this invention. The zone edges of the insert lens are bonded by surface S3 which is a sphere of radius 8.6 mm. The insert lens, when measured in air exhibits the two powers −0.25 D and 2.25 D. The points on the front surface of the insert lens can be fitted by a normal sphere of radius 8.672 mm, which causes a refractive power error in the zones of <0.05 D. The center thickness of the insert lens is 0.08 mm. It is assumed that the minimum layer thickness of the base lens material (button material) in front and in the back of the lenslet is 50 micron. The index of the insert lens is assumed to be 1.44, the index of the base lens—which is the index of the button material-is 1.40. Then a lens of back radius 7.3 mm and −10 D has a total center thickness of 0.18 mm, and a thickness at the outer edge of the optic zone of 0.305 mm. Practically the same values apply for a lens of 8.3 mm back radius and viewing power of again −10 D. For a +10 D lens the center thickness of a lens with 7.3 mm (8.3 mm) back radius is 0.363 mm (0.292 mm) and the thickness at the edge of the optic zone is 0.275 mm (0.202 mm). As will be appreciated, the parameters of most practical lenses will lie between the mentioned extremes.

Buttons of the described kind can be mass produced in an economic way, since, as demonstrated, the dimensions of the diffractive insert lens can be kept constant, even if lenses of wide ranges of different viewing powers and different base curves are to be fabricated from such prefabricated lens buttons. Also, it is considered advantageous that the lens producer does not have to dimension any zones of the diffractive lens, does not need any knowledge about diffractive lenses, and that he can fabricate (e.g. lathe) the finished lens from a normal lens button applying essentially standard cutting technology.

Although illustrative embodiments of the present invention have been described herein with reference to the accompanying drawings, it is to be understood that the invention is not limited to those precise embodiments, and that various other changes and modifications may be effected therein by one skilled in the art without departing from the scope of the invention.

What is claimed is:

1. A multifocal diffractive lens comprising at least two annular zone lenses and an optical step provided between adjacent annular zone lenses, each annular zone lens exhibiting a refractive power and wherein the annular zone lenses are configured such that an average refractive power $D_{av}$ of each of the annular zone lenses are substantially equal.

2. A multifocal diffractive lens as defined in claim 1, wherein optical path lengths of light rays extending from an object point to a conjugated image point are different by the optical step for light rays through adjacent annular zone lenses.

3. A multifocal diffractive lens as defined in claim 1, wherein the diffractive lens is embedded in a bulk optical material to form a lens button.

4. A multifocal diffractive lens as defined in claim 3, wherein the diffractive lens comprises a material having a refractive index $n_2$ and the bulk optical material has a refractive index $n_3$ which is not equal to $n_2$.

5. A multifocal diffractive lens as defined in claim 1, wherein any i-th annular zone lens exhibits a refractive power profile $D_{g,i}(r)$, r being the distance between an axis of the diffractive lens and a point on a back surface of said annular zone lens, such that an average power of zones, i, j, ... are given by $D_{av,i}$, $D_{avij}$ ... respectively, and wherein an absolute difference between the average power of all zones $D_{av}$ and $D_{av,i}$ is less than 0.2 diopters.

6. A multifocal diffractive lens as defined in claim 5, wherein the refractive power profile $D_{g,i}(r)$ is a constant value equal to the dioptric value $D_{av}$.

7. A multifocal diffractive lens comprising at least two adjacent annular zone lenses with an optical step between said adjacent annular zone lenses, wherein any i-th annular zone lens exhibits a refractive power profile $D_{g,i}(r)$, wherein r is the distance between an axis of the diffractive lens and a point on a back surface of said annular zone lens, such that an average power of zones i, j ... are given by $D_{av,i}$, $D_{av,j}$ ... respectively, and optical path lengths of light rays extending from an object point to a conjugated image point are different by said optical step for light rays transmitting through adjacent annular zone lenses, and wherein said annular zone lenses are shaped and positioned such that all of said average refractive powers $D_{av,i}$, $D_{av,j}$ . . . are essentially equal to a single value $D_{av}$.

8. A multifocal diffractive lens as defined in claim 7, wherein said refractive power profile $D_{g,i}(r)$ is a constant specified by a single dioptric value $D_{av}$.

9. A multifocal diffractive lens as defined in claim 7, wherein said lens exhibits essentially no intensity in the average refractive power $D_{av}$ of its individual zones.

10. A multifocal diffractive lens as defined in claim 7, wherein any of the annular zone lenses exhibits a back refracting surface, an intermediate refracting surface and a front refracting surface, wherein an optical medium of refractive index $n_3$ is positioned between said back refracting surface and said intermediate refracting surface, and wherein a different optical medium of refractive index $n_2 \neq n_3$ is positioned between said intermediate refracting surface and said front refracting surface.

11. A multifocal diffractive lens as defined in claim 10, wherein said back refracting surfaces form a single common surface and wherein said single common surface is substantially smooth.

12. A multifocal diffractive lens as defined in claim 11, wherein all points of intersection between said back refracting surface and said intermediate refracting surface lie on said single common surface.

13. A multifocal diffractive lens as defined in claim 10, wherein the intermediate refracting surfaces of the annular zone lenses are spherical surfaces.

14. A multifocal diffractive lens as defined in claim 10, wherein the front refracting surfaces of the annular zone lenses are spherical surfaces.

15. A multifocal diffractive lens as defined in claim 10, wherein no geometric steps are present between the back refracting surfaces of adjacent annular zone lenses and wherein no geometric steps are present between the front refracting surfaces of adjacent annular zone lenses.

16. A multifocal diffractive lens as defined in claim 7, wherein the lens is one of an ophthalmic lens, an intra-ocular lens and an intracorneal lens.

17. A multifocal diffractive lens comprising at least a central zone lens and at least one other annular zone lens defined as an i-th annular zone lens exhibiting a minimum annular radius $r_{i-1}$ and a maximum annular radius ri, wherein an optical step is provided between adjacent zone lenses, wherein any i-th annular zone lens is shaped and positioned such that a refractive power across said i-th annular zone lens exhibits a refractive power profile $D_{g,i}(r)$, wherein $f(r)=D_{g,1}(r)$ is the refractive power profile of said central zone lens and wherein said refractive power profile of said i-th annular zone lens is given by $D_{g,i}(r)=f(\sqrt{r^2-r_{i-1}^2})$, wherein r is the distance between a point on the back surface of said zone lens and the lens axis, and wherein the average refractive powers of all zone lenses have substantially the same value $D_{av}$.

18. A multifocal diffractive lens as defined in claim 17, wherein said refractive power profile $D_{g,i}(r)$ is a constant specified by a single dioptric value $D_{a,v}$.

19. A multifocal diffractive lens as defined in claim 17, wherein said lens exhibits essentially no power in the average refractive power $D_{av}$ of its individual zones.

20. A multifocal diffractive lens as defined in claim 17, wherein any of the annular zone lenses exhibits a back refracting surface, an intermediate refracting surface and a front refracting surface, wherein an optical medium of refractive index $n_3$ is positioned between said back refracting surface and said intermediate refracting surface, and wherein a different optical medium of refractive index $n_2 \neq n_3$ is positioned between said intermediate refracting surface and said front refracting surface.

21. A multifocal diffractive lens as defined in claim 20, wherein said back refracting surfaces form a single common surface and wherein said single common surface is substantially smooth.

22. A multifocal diffractive lens as defined in claim 21, wherein all points of intersection between said back refracting surface and said intermediate refracting surface lie on said single common surface.

23. A multifocal diffractive lens as defined in claim 20, wherein the intermediate refracting surfaces of the annular zone lenses are spherical surfaces.

24. A multifocal diffractive lens as defined in claim 20, wherein the front refracting surfaces of the annular zone lenses are spherical surfaces.

25. A multifocal diffractive lens as defined in claim 20, wherein no geometric steps are present between the back refracting surfaces of adjacent annular zone lenses and wherein no geometric steps are present between the front refracting surfaces of adjacent annular zone lenses.

26. A multifocal diffractive lens as defined in claim 17, wherein the lens is one of an ophthalmic lens, an intra-ocular lens and an intracorneal lens.

27. A lens comprising:
  an insert diffractive lenslet comprising at least two annular zone lenses and an optical step provided between adjacent annular zone lenses, each annular zone lens exhibiting a refractive power and wherein the annular zone lenses are configured such that an average refractive power $D_{av}$ of each of the zone lenses are substantially equal; and a bulk optical material in which the lenslet is embedded.

28. A lens as defined in claim 27, wherein any of the annular zone lenses exhibits a back refracting surface, an intermediate refracting surface and a front refracting surface, wherein an optical medium of refractive index $n_3$ is positioned between the back refracting surface and the intermediate refracting surface and an optical medium of refractive index $n_2$, which is not equal to $n_3$, is positioned between the intermediate refracting surface and the front refracting surface.

29. A lens as defined in claim 27, wherein optical path lengths of light rays extending from an object point to a conjugated image point are different by the optical step for light rays through adjacent annular zone lenses.

30. A lens as defined in claim 28, wherein any i-th annular zone lens exhibits a refractive power profile $D_{g,i}(r)$, r being the distance between an axis of the diffractive lens and a point on a back surface of said annular zone lens, such that an average power of zones, i, j, . . . are given by $D_{av,i}$, $D_{avij}$ . . . respectively, and wherein an absolute difference between the average power of all zones $D_{av}$ and $D_{av,i}$ is less than 0.2 diopters.

31. A lens as defined in claim 27, wherein the bulk optical material includes a front refracting surface and a back refracting surface, and further wherein the front and back refracting surfaces are adapted to be shaped to form one of a contact lens, an intraocular lens and an ophthalmic lens.

32. A lens as defined in claim 30, wherein the lenslet comprises a material having a refractive index $n_2$ and the bulk optical material comprises a material having a refractive index $n_3$, which is not equal to $n_2$.

* * * * *

UNITED STATES PATENT AND TRADEMARK OFFICE
CERTIFICATE OF CORRECTION

PATENT NO. : 6,120,148
DATED : September 19, 2000
INVENTOR(S) : Fiala, et al.

It is certified that error appears in the above-identified patent and that said Letters Patent is hereby corrected as shown below:

Column 4,
Line 55, now reads "value, Da,v."; should read -- value Dav. --; and

Column 5,
Lines 48, now reads "angle +and"; should read -- angle $\Phi$ and --; and
Line 49, now reads "PLE a"; should read --PLE $\lambda$,--; and Column 10,
Line 30, now reads "powers $D^g = D_{av}$,"; should read -- powers $D_g = D_{av}$ --; and
Line 37, now reads "condition $D_g = D_{av}$,"; should read -- condition $D_g = D_{av}$ --; and Column 11,
Line 21, now reads "the I st"; should read -- the $1^{st}$ --; and Column 13,
Line 34, now reads  "$D_{g,I} = D_0 - \sqrt{D_0^2 + kr_I - 1^2 - kr}$";
should read  -- $D_{g,i} = D_0 - \sqrt{D_0^2 + kr_i - 1^2 - kr^2}$ --; and Line 64, now reads "The difference AD"; should read -- The difference $\Delta D$ --; and Column 15,
Line 4, now reads "an amount At"; should read -- an amount $\Delta t$ --; and Column 16,
Line 30, now reads "the edge The last zone"; should read -- the edge of the last zone --.

Signed and Sealed this

Fourth Day of December, 2001

Attest:

NICHOLAS P. GODICI
*Attesting Officer*  *Acting Director of the United States Patent and Trademark Office*